US006173327B1

(12) United States Patent
De Borst et al.

(10) Patent No.: US 6,173,327 B1
(45) Date of Patent: *Jan. 9, 2001

(54) OBJECT-ORIENTED METHOD AND APPARATUS FOR INFORMATION DELIVERY

(76) Inventors: Jeroen De Borst, Alte Mauergasse 5, Bad Homberg (DE), 61348; Peter Bonham, AM Alten Bach 19, Bad Homberg (DE), 61352; Ansgar Erlenkoetter, Auf Der Heide 44, Neu-Anspach (DE), 61267; Andrew Schofield, LindenBuehl 27, Cham (DE), CH-6330; Reto Kaeser, Steinhugeistrasse, Mutschellen (CH), Ch-8968

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/678,317

(22) Filed: Jul. 11, 1996

(51) Int. Cl.$^7$ .................. G06F 15/177; G06F 15/163

(52) U.S. Cl. .................. 709/231; 709/301; 707/203; 713/100

(58) Field of Search ................ 395/200.57, 200.58, 395/200.59, 200.31, 200.33, 683, 682; 707/200, 103, 203; 709/231, 303; 713/100

(56) References Cited

U.S. PATENT DOCUMENTS

| | | | |
|---|---|---|---|
| 3,886,522 | 5/1975 | Barton et al. ............... | 340/146.1 |
| 4,941,170 | 7/1990 | Herbst ............... | 379/100.07 |
| 5,204,947 | 4/1993 | Bernstein ............... | 345/357 |
| 5,247,676 | 9/1993 | Ozur et al. ............... | 395/650 |
| 5,428,792 | 6/1995 | Conner et al. ............... | 395/708 |
| 5,457,797 | 10/1995 | Butterworth et al. ............... | 395/682 |
| 5,481,721 | 1/1996 | Serlet et al. ............... | 395/680 |
| 5,511,197 | 4/1996 | Hill et al. ............... | 395/683 |
| 5,515,508 | 5/1996 | Pettus et al. ............... | 395/200.33 |
| 5,535,386 | 7/1996 | Wang ............... | 707/203 |
| 5,551,035 | 8/1996 | Arnold et al. ............... | 395/683 |
| 5,568,639 | 10/1996 | Wilcox et al. ............... | 700/200 |
| 5,603,027 | 2/1997 | Ohkami ............... | 707/203 |
| 5,613,148 | 3/1997 | Bezviner et al. ............... | 395/800 |
| 5,621,885 | 4/1997 | Del Vigna, Jr. ............... | 395/182.11 |

(List continued on next page.)

FOREIGN PATENT DOCUMENTS 0 381 645   8/1990 (EP).
WO 94/09428  4/1994 (WO).

OTHER PUBLICATIONS

Ananda et al., "Astra–An Asynchronous Remote Procedure Call Facility", Conf. 11 International Conference on Distributed Computing Systems, Arlington, Texas, May 20, 1991, IEEE, pp. 172–179, XP000221855.

Chatterjee, A., "Futures: A Mechanism for Concurrency Among Objects", Proceedings of the Supercomputing Conference, Reno, Nov. 13–17, 1989, No. Conf. 2, Nov. 13, 1989, IEEE, pp. 562–567, XP000090924.

IBM, "Somobjects Developer Toolkit User Guide, Version 2.1 (Chapter 6)", Oct. 1994, IBM, US, XP002047926.

(List continued on next page.)

* cited by examiner

*Primary Examiner*—Dung C. Dinh
(74) *Attorney, Agent, or Firm*—Thompson & Knight, LLP

(57) ABSTRACT

An object-oriented method and apparatus for delivering information from one component to another across a network of computers includes the steps of loading implementation libraries for adapter and information provider components into memory and creating factory objects for those components. When a request arrives over the network, the factory objects are called and stream objects are created by the factory objects. Data is then streamed from an information provider source to the original requester using the stream objects.

20 Claims, 14 Drawing Sheets

U.S. PATENT DOCUMENTS

| | | | |
|---|---|---|---|
| 5,627,979 | 5/1997 | Chang et al. | 707/104 |
| 5,642,511 | 6/1997 | Chow et al. | 395/701 |
| 5,664,177 | 9/1997 | Lowry | 707/100 |
| 5,664,206 | 9/1997 | Murow et al. | 704/8 |
| 5,671,416 | 9/1997 | Elson | 395/702 |
| 5,675,805 | 10/1997 | Boldo et al. | 395/706 |
| 5,689,689 | 11/1997 | Meyers et al. | 395/553 |
| 5,701,490 | 12/1997 | Safanov | 395/705 |
| 5,724,503 | 3/1998 | Kleinman et al. | 395/185.1 |
| 5,732,219 | 3/1998 | Blumer | 395/200.57 |
| 5,732,270 | 3/1998 | Foody et al. | 395/683 |
| 5,742,762 | 4/1998 | Scholl | 395/200.3 |
| 5,758,163 | 5/1998 | Safanov | 395/708 |
| 5,761,511 | 6/1998 | Gibbons et al. | 395/705 |
| 5,761,656 * | 6/1998 | Ben-Shachar | 345/335 |
| 5,768,564 * | 6/1998 | Andrews et al. | 395/500 |
| 5,778,228 * | 7/1998 | Wei | 395/684 |
| 5,848,273 * | 12/1998 | Fontana et al. | 395/701 |
| 5,860,010 * | 1/1999 | Attal | 395/706 |
| 5,860,072 * | 1/1999 | Schofield | 707/101 |
| 5,897,636 * | 4/1999 | Kaeser | 707/100 |

OTHER PUBLICATIONS

Menon et al., "Object Replacement Using Dynamic Proxy Updates", Proceedings of the International Workshop on Configurable Distributed Systems, IEEE, Jan. 1, 1994, pp. 82–91, XP002004310.

Menon et al., Asynchronous Events Tools for Distributed Programming in Concurrent Object Based Systems, 1993.

OMG, ORB Products, Chapter 21, pp. 299–326, (1995).

Hall et al., "Windows Sockets—An Open Interface for Network Programming Under Microsoft Windows", Jan. 20, 1993.

Wijngaarden et al., "Revised Report on the Algorithmic Language ALGOL 68", (1976), Springer-Verlag, New York, Chapter 7: Modes and Nests, pp. 98–107, XP002047543.

Neufeld et al., "The Design and Implementation of an ASN.1–C Compiler", IEEE Transactions on Software Engineering, vol. 16, No. 10, Oct. 1990, New York, pp. 1209–1220, XP000162480.

"Data Structures Made Accessible From Outside the Application", IBM Technical Disclosure Bulletin, vol. 35, No. 2, Jul. 1992, Armonk, NY, pp. 255–256, XP000313288.

Katwijk, J. Van, "Addressing Types and Objects in ADA", Software Practice and Experience, vol. 17, No. 5, May 1987, Great Britain, pp. 319–343, XP002030193.

"The Common Object Request Broker Architecture and Specification", Rev. 2.0, Chap. 1–4, Jul. 1995.

Jacquemot, C. et al., "Cool: The Chorus CORBA Compliant Framework", Intellectual Leverage: Digest of Papers of the Spring Computer Soci International Conference (Compcon), San Francisco, Feb. 28–Mar. 4, 1994, No. –, Feb. 28, 1994, IEEE, pp. 132–141, XP00047938.

"Distributed Object Activation and Communication Protocols", IBM Technical Disclosure Bulletin, vol. 37, No. 7, Jul. 1, 1994, pp. 539–542, XP002009565.

Neufeld et al., "An Overview of ASN.1", Computer Networks and ISDN Systems, vol. 23, No. 5, Feb. 1, 1992, pp. 393–415, XP000249379.

Pompeii, J., "Distributed Objects and the Internet", Dr. Dobb's Journal on CD–ROM, vol. 21, No. 3, pp. 1–9, Mar. 1996.

North, K., "Understanding OLE: Microsoft's Language–Independent, Binary Standard for Object Sharing on Desktops and Across Networks", DBMS, vol. 8, No. 7, pp. 50–57, Jun. 1995.

Jagannathan, V. et al., "Collaborative Infrastructures Using the WWW and CORBA–Based Environments", Proc. of Wet Ice, Jun. 19, 1996, pp. 292–297.

Ross, M., "Portability by Design", Dr. Dobb's Journal, vol. 19, No. 3, pp. 40–46, Mar. 1994.

Box, D., "Q&A: ActivX/COM.", Microsoft Systems Journal., vol. 11, No. 11, pp. 91–98, Nov. 1996.

Vogel et al., "Understanding and IDL Lesson one: DCE and CORBA", Services in Distributed & Networked Environments, 1996 3rd Int'l Workshop, pp. 114–121, 1996.

Zelesko et al. "Specializing Object–Oriented RPC for Functionality and Performance", Distributed Computing System, 1996 Inter Conf., pp. 175–187: Online. CD. IEEE/IEE Publications Ondisc, 1996.*

Ravindran et al. "Object–Oriented Communication Structures for Multimedia Data Transport", IEEE Journal on Selected Areas in Communications, v14 iss7, Sep. 1996, pp. 1310–1375: Online. CD. IEEE/IEE Publications Ondisc.*

Article by Kinane et al., entitled "Distributing broadband multimedia systems using CORBA" published by Computer Communications on Jan. 1996 Elsevier, UK, vol. 19, No. 1 pp. 13–21.

Article by Orfali et al., entitled "Client/Server Programming with OS/2 2.0" published by Van Nostrand Reinhold, New York, USA Chapter 40: "SOM, OOP, and WPS Classes" on 1992, pp. 951–978.

Article by Trehan et al., entitled "Toolkit for Shared Hypermedia on a Distributed Object Oriented Architecture" published by Proceedings ACM Multimedia 93, Proceedings of First ACM International Conference on Multimedia, on 1993 pp. 175–181.

Article by Yang et al., entitled "CORBA: A Platform for Distributed Object Computing (A State of the Art Report on OMG/CORBA)" published by Operating Systems Review (SIGOPS),on vol. 30, No. 2, Apr. 1, 1996, pp. 4–31.

OBJECT-ORIENTED METHOD AND APPARATUS FOR INFORMATION DELIVERY

RELATED APPLICATIONS

The following related U.S. applications are hereby incorporated by reference: U.S. application Ser. No. 08/680,270 (pending) entitled "Method and Apparatus for Describing an Interface Definition Language-Defined Interface, Operation, and Data Type" by A. Schofield, filed Jul. 11, 1996; U.S. application Ser. No. 08/678,681 (pending) entitled "Method and Apparatus Using Parameterized Vectors For Converting Interface Definition Language-Defined Data Structures Into A Transport And Platform Independent Format" by A. Schofield, filed Jul. 11, 1996; U.S. application Ser. No. 08/678,298 (pending) entitled "Data Structure Representing An Interface Definition Language Source File" by A. Schofield, filed Jul. 11, 1996; U.S. application Ser. No. 08/680,203 (now U.S. Pat. No. 5,860,072) entitled "Method and Apparatus for Transporting Interface Definition Language-Defined Data Structures Between Heterogeneous Systems" by A. Schofield, filed Jul. 11, 1996; U.S. application Ser. No. 08/678,295 (pending) entitled "Method and Apparatus for Performing Distributed Object Calls" by A. Schofield filed Jul. 11, 1996; U.S. application Ser. No. 08/680,202 (pending) entitled "Method and Apparatus for Asynchronously Calling and Implementing Objects" by A. Schofield, filed Jul. 11, 1996; U.S. application Ser. No. 08/680,266 (pending) entitled "Method and Apparatus for Performing Distributed Object Calls using Proxies and Memory Allocation" by A. Schofield filed Jul. 11, 1996.

BACKGROUND OF THE INVENTION

1. Field of the Invention

The present invention relates to an object-oriented method and apparatus for delivering information within a computer or across a network of computers. More particularly, the invention relates to a distributed object system using a factory/stream model for delivering data and related context from one component in the computer or network to another.

2. Background

Distributed computing consists of two or more pieces of software sharing information with each other. These two pieces of software could be running on the same computer or on different computers connected to a common network. Most distributed computing is based on a client/server model. With the client server model, two major types of software are utilized: client software, which requests the information or service, and server software, which provides the information or service.

Information or services are usually delivered from server to client by Information Delivery System software applications. Such applications are often monolithic, protocol-specific, UNIX-based server applications consisting of a module that awaits a request for information from a client application. Once that request arrives, the module will copy (or "replicate") itself and the copy of the module will process the request. The request will be processed by the copy, for example, by providing information from an SQL database or information contained in a local disk file. Meanwhile, the original module will continue to monitor for incoming requests.

This information delivery system architecture, however, is usually protocol-specific. In other words, the delivery system application only supports a particular protocol, such as HTTP, TCP/IP, or SPX. Thus, requests arriving via an unsupported protocol cannot be serviced. Such systems are inherently inflexible and non-extensible.

Attempts by monolithic applications to support multiple protocols further demonstrate their non-extensibility. Generally, however, adding support for several protocols requires adding additional code in the application. As more and more protocols are created, the application becomes correspondingly larger. If the application is executing a single process, the application may run without errors. If, however, the application is running multiple processes, too many system resources are utilized and the application crashes.

Moreover, the lack of fault tolerance and error-handling in many of these systems makes correction almost impossible. When system resources are depleted and the application terminates, it is often difficult to determine which client request triggered the breakdown. For instance, the system has no built-in mechanism for determining whether an SQL query or a World Wide Web page request caused the error. Accordingly, the application cannot be readily debugged and corrected.

One possible solution is the use of a distributed object system. Distributed object computing combines the concepts of distributed computing (described above) and object-oriented computing. Object-oriented computing is based upon the object model where pieces of code called "objects"—abstracted from real objects in the real world—own attributes and provide services through methods (or "operations" or "member functions"). Typically, the methods operate on the private attributes (data) that the object owns. A collection of like objects make up an interface (or "class" in C++ parlance). Each object is identified by a unique identifier called an object reference.

In a distributed object system, a client sends a request (or performs an "object call") containing an indication of the operation for the server to perform, the object reference, and a mechanism to return "exception information, about the success or failure of a request. In addition, certain "context" information concerning the client (such as the platform or machine) may be included in the request. The server receives the request and, if possible, carries out the request on the specific object and returns information regarding the success or failure of the operation ("exception information"). Both client and server must have information about the available objects and operations that can be performed. Accordingly, both must have access to a common language, such as the Interface Definition Language (IDL), as defined by the Object Management Group (OMG). Interface definitions are usually written in IDL, compiled, and linked into the client and server applications.

Distributed object computing solves some of the problems associated with the prior art monolithic applications. With distributed objects, large applications can be broken down into smaller "components", making the system more manageable and less subject to breakdown. Moreover, the system allows various components to plug-and-play, interoperate across networks, run on different platforms, coexist with legacy applications through object wrappers, roam on networks, and manage themselves and the resources they control. In addition, errors may be caught using exception handling.

Unfortunately, the current standard architectures for distributed systems have not specifically addressed how information can be provided from numerous information providers to clients over multiple protocols. The Common Object Request Broker Architecture (CORBA) proposed by OMG utilizes an object request broker (ORB) to handle object calls between a client and a server. The CORBA standard, however, remains tied to the use of a specific protocol. Other standards, such as OpenDoc and OLE, are similarly protocol-specific.

Furthermore, in traditional distributed object systems, a classical object call is based upon a request/response mechanism. Accordingly, only certain amounts of information may be transmitted in a particular object call. Prior art information delivery systems offer no mechanism for supporting delivery of large amounts of data (4 GB of video data, e.g.).

Accordingly, a need exists for a method for delivering information that supports multiple protocols.

Further, a need exists for a method for delivering information that uses distributed object technology to promote the use of individual components.

Further, a need exists for a method for delivering large amounts of data across a network.

SUMMARY OF THE INVENTION

The present invention is directed to an object-oriented information method and system having support for multiple protocols. The information delivery system of the present invention further permits the delivery of large amounts of information to client applications across a network.

In a preferred embodiment, the object-oriented method for delivering information includes the following steps. First, adapter components for requesting information, information provider components, and navigator components are loaded into the memory of one or multiple computers. A navigator object, adapter factory object, and information provider factory object are created. When a request arrives from a requester on the network, the factory objects are called to create stream objects. The stream objects are used to stream information from an information source to the requester. The stream interface includes operations for writing and reading data to and from an information source. By utilizing this model, data can be streamed in discrete portions from the information source to the requester.

In another embodiment, an object-oriented information delivery system of the present invention includes at least one information provider component that provides information via a server or a gateway to another server and at least one adapter component for requesting information from the information provider component via a request. Each component is implemented as an implementation library. Numerous adapter components can be utilized in the system corresponding to the various protocols that are available. Each adapter component is equipped with numerous sub-components, including a dispatcher component that dispatches the request to the other sub-components and a navigator component that decides what information provider to utilize to fulfill the request. Finally, the system utilizes object-oriented technology for discretely sending packets of information from the information provider component to the adapter component. In particular, the system uses a factory/stream model where each adapter and information provider component implements a factory interface that allows stream objects to be created and a stream interface that allows large units of information to be retrieved or stored.

The information delivery system can also utilize a trader component that acts as an intermediary between the adapter components and the information provider component. If the trader is used, the navigator sub-component selects the trader and the trader selects the correct information provider. The trader component can also be replicated and the navigator sub-component then selects the proper trader.

The information delivery method and apparatus of the present invention facilitates the creation of scalable and extensible components that can be adapted to numerous information delivery scenarios. More significantly, the object-oriented aspect of the present invention allows various components to deliver information in a protocol-independent manner across heterogeneous platforms.

A more complete understanding of the information delivery system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

I. Hardware Overview

Figure 1:
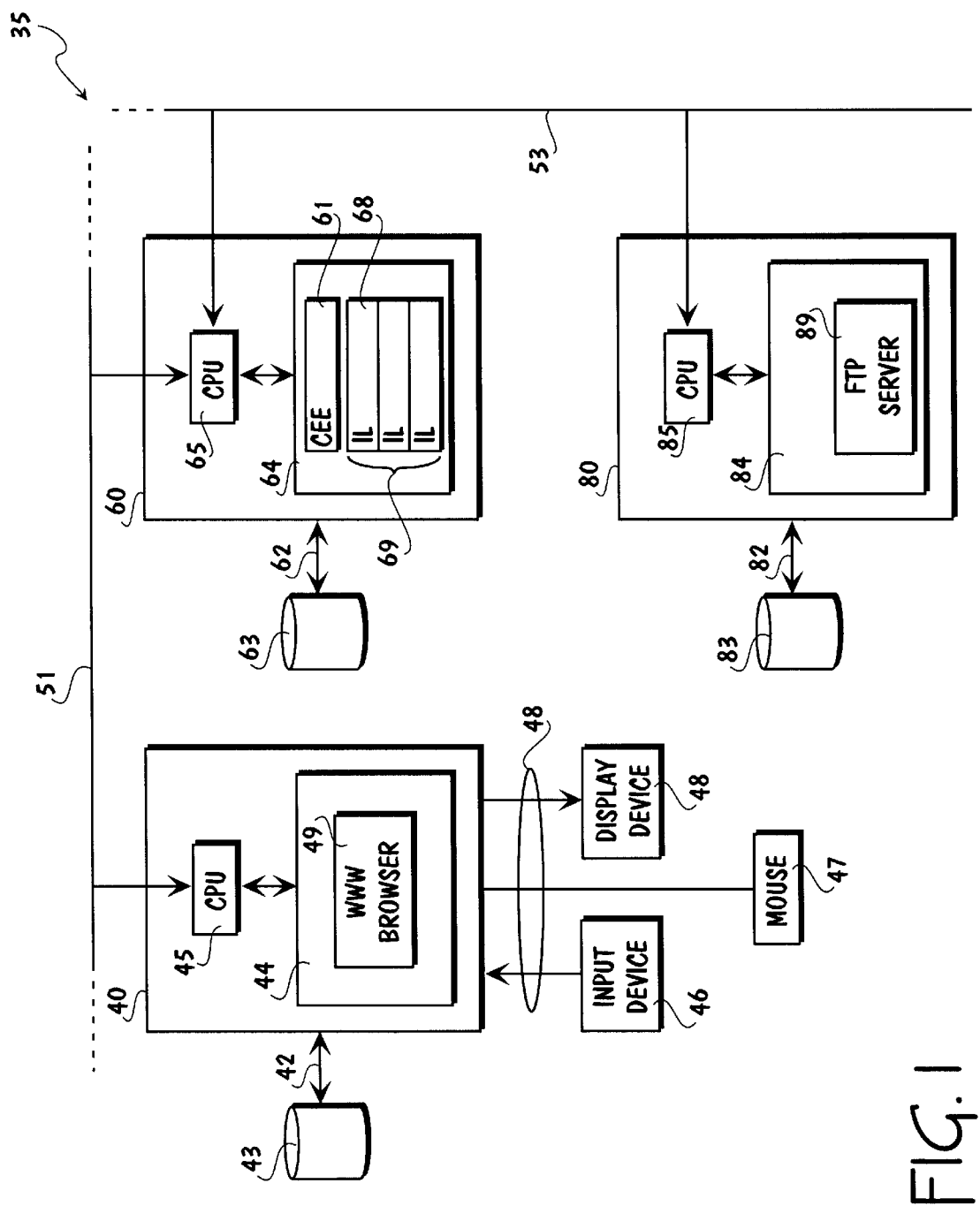
FIG. 1 is a block diagram of a network implementing the method of the present invention.

FIG. 1 shows a sample network 35. The network 35 includes a client computer 40, an Information Matrix ("IM") computer 60 using the information delivery method and apparatus of the present invention, and a remote file server computer 80. The client computer 40, IM computer 60, and file server computer 80, are connected by network connections 51, 53, such as internet connections. The client computer 40 communicates over a bus or I/O channel 42 with an associated disk storage subsystem 43 and via an I/O channel 48 with an input device 41, such as a keyboard, display device 48, such as a video display terminal ("VDT"), and mouse 47. The client computer 40 includes a CPU 45 and a memory 44 for storing current state information about program execution. A portion of the memory 44 is dedicated to storing the states and variables associated with each function of the program which is currently executing on the client computer 40. The client computer memory 44 includes a World Wide Web ("WWW") browser 49, such as the browser sold under the trademark Netscape Navigator by Netscape Communications Corp.

The file server computer 80 communicates over a bus or I/O channel 82 with an associated disk storage subsystem 83. The server system 80 includes a CPU 85 and a memory 84. The file server memory 84 includes a file transport protocol ("FTP") server 89 loaded therein. The FTP server 89 provides other computers (such as the IM Computer 60 and the client computer 40) with files from the disk subsystem 83 or from other remote computers that communicate with the file server computer 80.

The IM computer 60 communicates over a bus or I/O 62 with an associated disk storage subsystem 63. The IM computer 60 includes a CPU 65 and a memory 64. The memory 64 includes one or more implementation libraries 68 and an execution environment ("CEE") 61 (as discussed below).

The network 35 as shown in FIG. 1 is merely demonstrative of a typical network. The method and apparatus of the present invention uses distributed software which may be distributed over one ore more computers. Thus, the implementation libraries 68 and execution environment 61 may be stored in the client computer memory 44 or the file server computer memory 84. Furthermore, the World Wide Web browser 49, FTP server 89, and execution environment 61 may be loaded on a single computer.

II. Distributed Computing Environment

The method and apparatus of the present invention may be utilized within any distributed computing environment. In a preferred embodiment, the Common Execution Environment ("CEE") 61, which is a component of the Tandem Message Switching Facility ("MSF") Architecture, is used. The CEE activates and deactivates objects and is used to pass messages between implementation libraries loaded in CEE "capsules". The CEE may be stored in the memory of a single machine, as shown in FIG. 1. More likely, however, copies of the CEE and implementation libraries will be loaded on multiple machines across a network.

The CEE uses a "capsule" infrastructure. A capsule encapsulates memory space and one or more execution streams. A capsule may be implemented differently on different systems depending upon the operating system used by the system. For instance, on certain systems, a capsule may be implemented as a process. On other systems, the capsule may be implemented as a thread.

Figure 2:
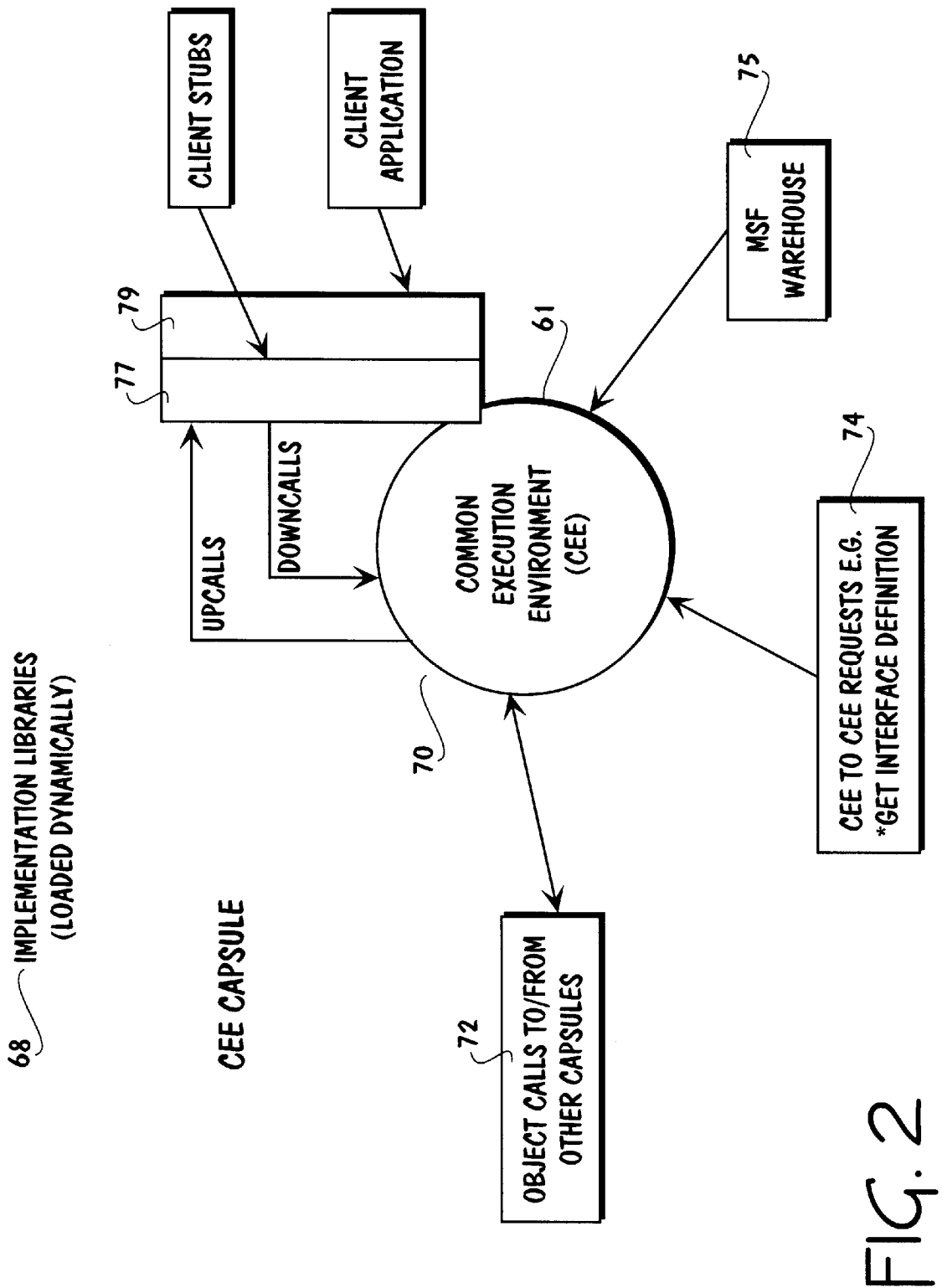
FIG. 2 is a Common Execution Environment capsule.

FIG. 2 shows a CEE capsule 70 contained in, for example, an IM computer 60 that includes the CEE 61 and certain of the core CEE components and implementations of objects contained within Implementation Libraries 68. The Implementation Libraries 68 include handwritten code, such as a client or server application 79 and client stubs 77 generated from the IDL specification of the object's interface, as described below. The Implementation Libraries 68 and the CEE 61 interact through the down-calling of dynamically-accessible routines supplied by the CEE 61 and the up-calling of routines contained in the Implementation Library. The CEE 61 can also receive object calls 82 from other capsules within the same machine and requests 84 from other CEE's.

Objects implemented in a CEE capsule may be configured or dynamic. Configured objects have their implementation details stored in a repository (such as the MSF Warehouse 75) or in initialization scripts. Given a request for a specific object reference, the CEE 61 starts the appropriate capsule based on this configuration data. The capsule uses the configuration data to determine which Implementation Library to load and which object initialization routine to call. The object initialization routine then creates the object. Dynamic objects are created and destroyed dynamically within the same capsule. Dynamic objects lack repository-stored or scripted configuration information.

The following paragraphs describe a system-level view of how the Implementation Libraries 68 interact with the CEE 61. The CEE 61 implements requests to activate and deactivate objects within a capsule. In addition, the CEE facilitates inter-capsule object calls 72 as well as requests from other CEE's 74, as discussed above. Object activation requests arise when an object call from a client or server application must be satisfied. To activate an object, the CEE 61 loads the appropriate Implementation Library (if not already loaded) containing the object's operations and then calls a configured object initialization routine contained in the Implementation Libraries 68, as discussed below. The initialization routine specifies which interface the Implementation Libraries support and registers the entry points of the object's operations to be called by the CEE 61 at a later time.

The Implementation Libraries 68 are loaded at start-up. During start-up, the CEE 61 runs its own initialization routine. This initialization routine tells the CEE 61 where to locate the various Implementation Libraries 68. Once located by the CEE 61, the CEE 61 calls the initialization routines in the Implementation Libraries 68. The initialization routines contained in the Implementation Libraries must first carry out any required application-specific initialization (e.g., opening files). Next, both the initialization routines call a generated stub function which, in turn, down-calls a CEE function (contained in a dynamic library as stated above) called CEE_INTERFACE_CREATE to specify the object's interface. An interface may be specified for each object. The interface description is normally generated from an IDL description of the interface, as discussed below. CEE_INTERFACE_CREATE creates an interface and returns an "interface handle" to the newly created interface. The handle is a unique identifier that specifies the interface. The initialization routine then uses the interface handle to down-call CEE_IMPLEMENTATION_CREATE. CEE_IMPLEMENTATION_CREATE returns an "implementation handle," that is a unique identifier specifying the implementation for each operation in the interface. Finally, the initialization routine uses the implementation handle to call a stub function which down-calls CEE_SET_METHOD. CEE_SET_METHOD specifies the actual addresses of specific method routines of the implementation as contained in the implementation libraries 68.

III. Compiling and Linking IDL Source Files

Figure 3:
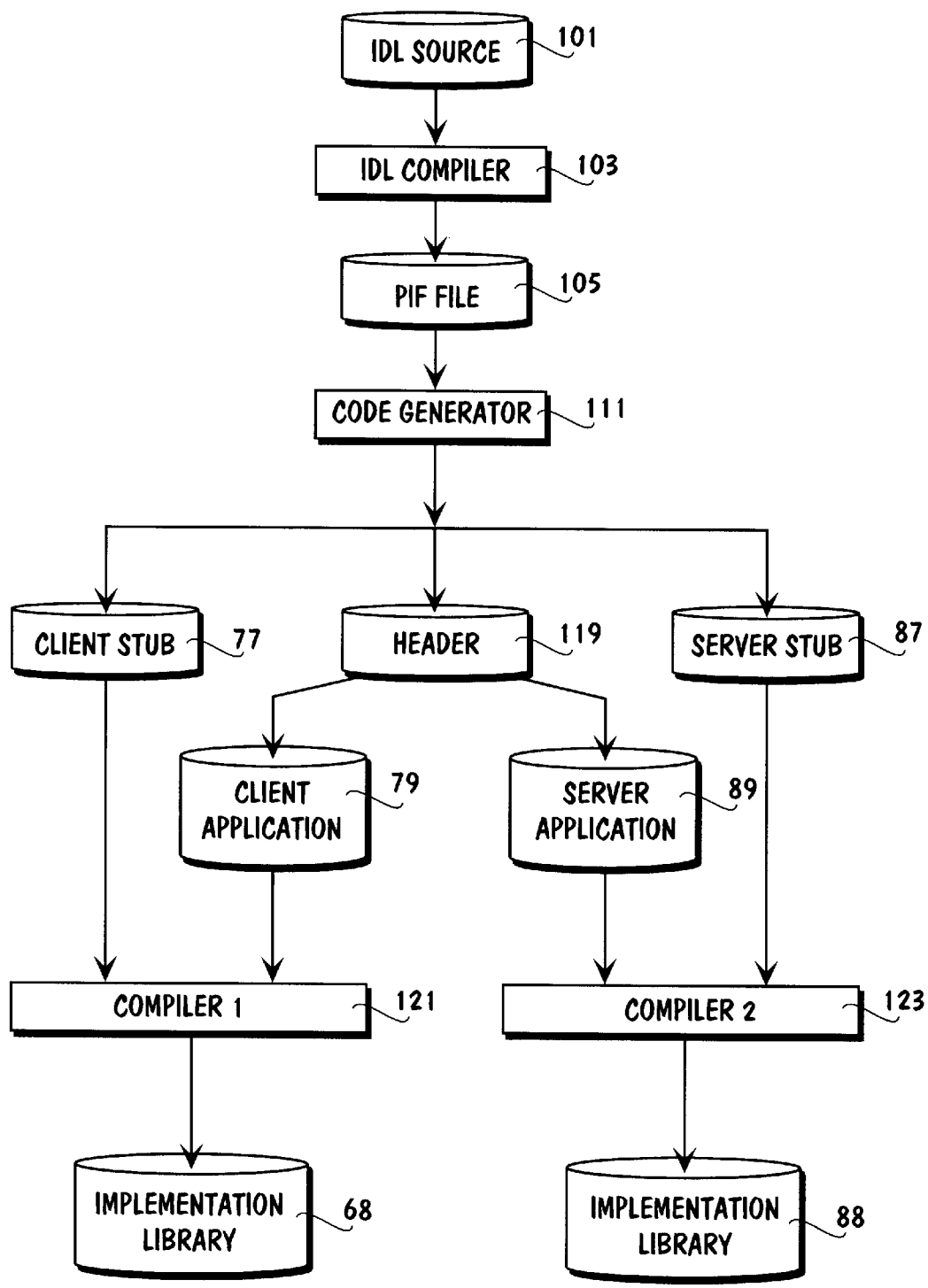
FIG. 3 is a block diagram showing the compilation and linking of IDL source files.

FIG. 3 shows how Interface Definition Language ("IDL") source files are compiled into the implementation libraries that are used in the method and apparatus of the present invention. First, an IDL source file 101 is prepared containing IDL interface definitions. An IDL compiler 103 compiles the source file 101. The IDL compiler 103 parses the code 101 to produce an intermediate Pickled IDL file ("PIF") file 105 for storage of the original source file. A code generator 111 then parses the PIF file. Alternatively, the IDL compiler and code generator may be combined to generate code. The code generator 111 generates files in the language of the client and server applications. If the client and server applications are in different languages, different code generators 111 are used. Alternatively, the code generator 111 and the IDL compiler 103 may be combined in a single application to produce language-specific code. The code generator 111 produces a client stub file 77 containing client stub functions and a server stub file 87 containing definitions of object implementations. The client stub file 77 and the server stub file 87 are compiled by programming language-specific compilers 121, 123 to produce compiled client stub object code and compiled server stub object code. Similarly, a client application 79 and a server application 89 are compiled by programming-language-specific compilers to produce compiled client application object code and compiled server application object code. The client application 79 and the server application 89 also include a header file 119 generated by the code generator 111. The header file 119 contains common definitions and declarations. Finally, language compiler 121 links the client application object code and the client stub object code to produce an implementation library 71. Similarly, second language compiler 123 links the server application object code and the server stub object code to produce another implementation library 81.

IV. Factory and Stream Interfaces

The method and apparatus of the present invention are used within an information delivery system ("Information Matrix") composed of one or more software components that can be distributed across a network. Each component can be implemented in a variety of ways. The method and apparatus of the present invention permits a developer to implement each component to suit particular information delivery tasks. The preferred implementation for each component, however, is as part of an Implementation Library 68 that is loaded and executed within the CEE 61. Each implementation library 68 implements IDL-defined interfaces to create objects of those interfaces. Interface descriptions are written in IDL, then compiled by an IDL compiler and linked into the code of the component by a code generator, as discussed above. The component then creates an object of that interface. Each object interacts with another object through object calls.

Figure 5:
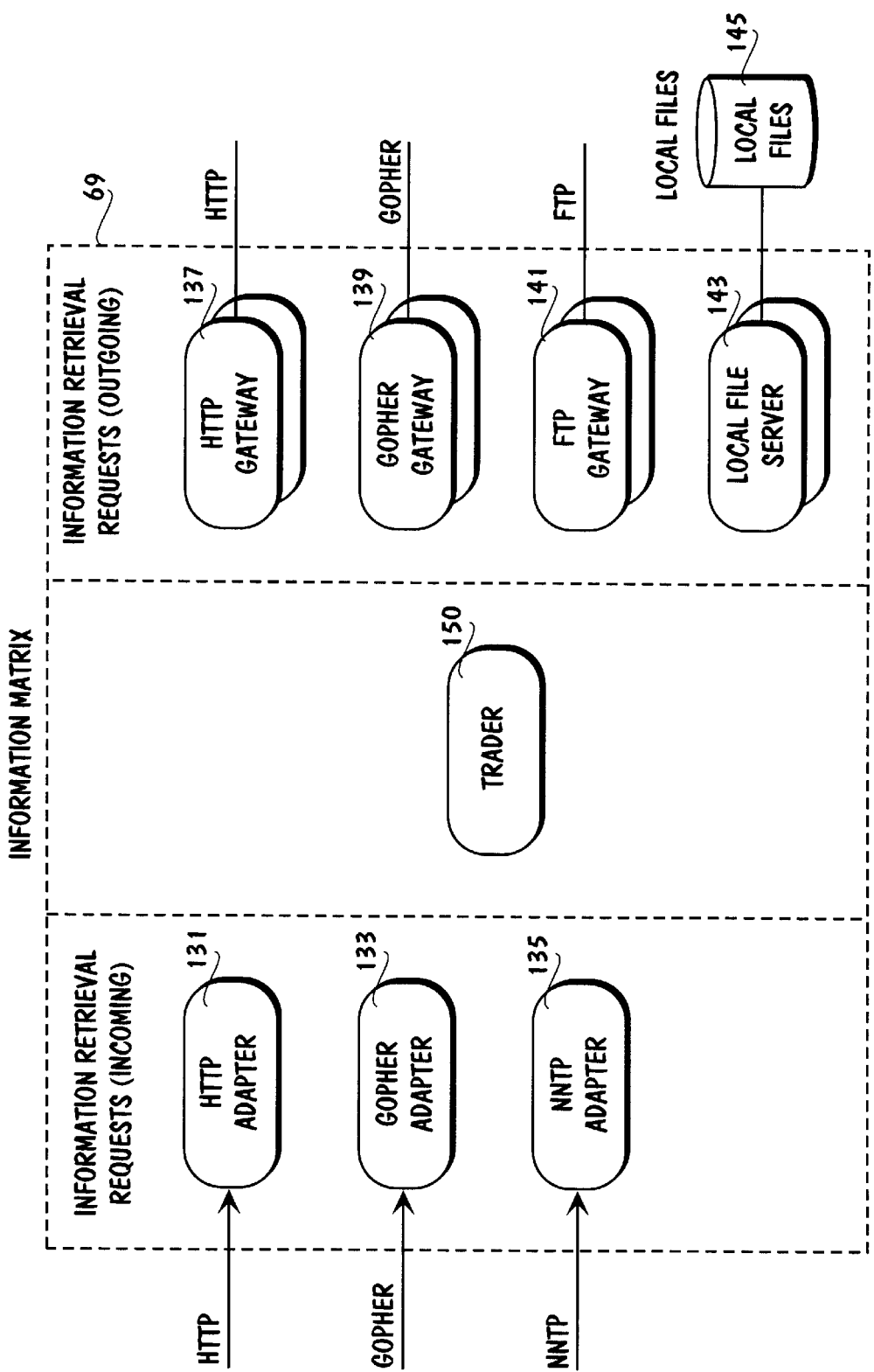
FIG. 5 is an architectural overview of the Information Matrix.

As shown in FIG. 5, the components of the Information Matrix 69 can be divided into four primary abstract components (abstractions): (1) Adapters; (2) Servers; (3) Gateways; and (4) Traders. Each Abstraction includes one or more actual software components (Implementation Libraries). In the examples described herein, all of the abstractions and their included components are loaded on a single IM computer. It is possible, however, for certain components to be loaded on the client computer and for certain components to be loaded on the server computer. The Adapter abstraction provides a method for requesters to retrieve information from the Information Matrix 69. In FIG. 1, the World Wide Web browser 49 loaded in the client machine memory would be the requestor. The request would arrive at one of the components of the Adapter abstraction loaded in the IM computer memory 64. FIG. 5 shows sample Adapter abstractions, including a Hypertext Transport Protocol ("HTTP") Adapter 131, a Gopher (Internet server) protocol Adapter 133, and a Network News Transport Protocol Adapter 135. Additional Adapter abstractions could be added for other types of information retrieval requests. The Gateway abstraction connects external information sources to the information system. FIG. 5, for example, shows an HTTP Gateway 137, a Gopher Gateway 139, and a File Transport Protocol ("FTP") Gateway 141. Servers 143 reside inside the information delivery system to provide information from a local source, such as a disk file 145. Gateways and Servers are referred to as "information providers" since both provide information to Adapters (Gateways provide information from an external source, while Servers provide information from an internal source). Finally, a Trader 150 selects one instance of a required type of Gateway or Server based upon a method that attempts to balance the load on information providers. Information may be provided to requestors, however, without the use of a Trader 150.

Each component of the present invention can implement numerous IDL interfaces. The present invention requires, however, that, for certain components, two interfaces be implemented: the Factory interface and the Stream interface. For certain components that implement the Factory and Stream interfaces, the interfaces are implemented exactly as defined below. Other components, however, "inherit" the operations of the Factory and Stream interfaces, i.e., the component adds operations to these interfaces. The Factory and Stream interfaces are utilized by certain components to stream large amounts of data from one component to another.

The Factory interface is called by an object (of any component) to create a Stream object that, in turn, is used to deliver large amounts of data between components. The Factory interface contains only a Create operation and raises only one exception (an unexpected occurrence). The Create operation is defined in IDL as follows:

```
void Create (   in String           path,
                in unsigned long    factoryType,
                inout unsigned long contextBuffer,
                out unsigned long   streamType,
                out Stream          streamObject,
                out unsigned long   streamHandle
            )
raises (Exception);
```

The first parameter, path, is the name of the resource for which a stream of information needs to be created. The second parameter is a factory type parameter that contains values indicating that the factory operation needs to find a resource and create a stream for that resource. The contextBuffer parameter contains the "Context" for the stream requested and can contain data that may cause the factory to behave differently. For instance, the context may include a request for data of a particular type (.JPEG, .GIF, e.g.). (A preferred configuration for the propagation of context is discussed below). The Create operation has three output parameters. A streamType parameter indicates the direction of the stream for the returned Stream object. The streamType parameter can have three possible values indicating whether the stream is for a "Get" operation only, for a "Put" operation only, or whether both operations can be performed. Each of these operations is discussed in detail below. The streamObject parameter contains an object reference for the requested Stream object. All subsequent stream operations must be addressed to this object. The streamHandle parameter identifies the stream of information within the Stream object. The streamHandle is provided to the Stream object to obtain information from the object.

The Factory interface raises only one exception if an error occurs. In the preferred embodiment, an exception is raised for one or more of the following reasons: (1) the stream table is full; (2) the process does not have access to the required information for security reasons; (3) the requested resource does not exist; (4) the requested resource is not available (due to a locked file or a failed remote host, e.g.); (5) the requested resource is not available in one of the requested formats (the file is a .JPEG file and the caller specified that it would only accept .GIF files, e.g.); and (5) the operation was successful but no data is present.

The Stream interface supports the streaming of information from one component to another component. Object calls are limited to a certain size depending upon the underlying mechanism used and its implementation on a specific system. The Stream interface facilitates the retrieval of information significantly larger than normal through multiple calls to an object's "Get" operation, as described below.

A Stream object is called by other objects to obtain discrete units of information. The Stream interface contains four operations: Get, Put, Destroy, and Cancel. The Get operation is defined in IDL as follows:

```
void Get (   inout unsigned long   opID,
             in unsigned long      handle,
             inout unsigned long   offset,
             in unsigned long      length,
             out unsigned long     buffer,
             out boolean           endofStream,
         )
         raises (Exception);
```

The Get operation is used by a component to read data from a Stream object ("stream" or "data stream") identified by a "handle." Data can be read sequentially or randomly. The Get operation takes handle, length, buffer, end of stream, operation identifier and offset parameters. The handle parameter identifies the requested stream of information. The handle for a stream of data is returned from the call to the Create operation on a Factory object. A length parameter specifies the amount of data the calling component is willing to accept. The maximum value allowed for the length is defined by the transport mechanism used for the object call. The actual amount of data returned may be less depending upon the implementation. The buffer parameter contains the requested data upon a successful return from the operation. The end of stream parameter (usually a boolean) indicates whether more data exists within the requested stream. The offset parameter describes the start of the block of data that is to be read. This value can be a byte position (if the particular implementation supports random data access) or a value that indicates that the data block starts right after the previous data block read from the stream. The operation identifier simply identifies the read operation.

The Put operation is called to write data to the stream identified by the handle. Data can be written sequentially or, if the implementation permits, in random order. The Put method is defined as follows:

```
void Put (   inout unsigned long   opID,
             in unsigned long      handle,
             in unsigned long      offset,
             in unsigned long      buffer
         )
         raises (Exception);
```

As the definition shows, the Put operation takes four parameters. The parameters are similar to their counterparts in the Get method, except these parameters correspond to a write operation.

The Destroy operation is called when the stream identified by the stream handle is no longer needed. The Destroy method is defined as follows:

```
void Destroy (inout unsigned long   opID,
              in unsigned long      handle,
              in unsigned long      dispose
          )
          raises (Exception);
```

The Destroy operation takes only three parameters: the operation identifier, the stream handle, and a dispose parameter that indicates how the stream should be disposed. In a preferred embodiment, the dispose parameter has three possible values indicating that the streaming completed successfully, the streaming completed unsuccessfully, or the streaming did not complete successfully because of an exception that occurred.

The Cancel method is used to cancel an outstanding stream operation. The method is defined as follows:

```
void Cancel (   in unsigned long   handle,
                in unsigned long   opID
            )
            raises (Exception);
```

The Cancel method takes only two parameters: the handle to the stream and the operation identifier.

The Stream interface raises only one exception if an error occurs. The exception returns information regarding the streaming operation. In the preferred embodiment, exception information is returned for one or more of the following reasons: (1) the object that received the object call has no stream with the requested handle; (2) the stream has lost access to the data that was streaming due to a closed connection, file deletion or similar event; (3) a specific offset was out of bounds (larger than the file size); (4) a specific offset was out of reach for the stream implementation (Get method); (5) a "Get" method was performed on a stream object that should be written or a "Put" method was attempted on a stream object that should be retrieved; (6) a stream operation failed because of a time-out that occurred while an I/O operation occurred on behalf of the operation; and (7) Get or Put operation was performed requesting or supplying more data than the stream implementation can provide.

V. Context

As stated above, the components used by the present invention are configured as Implementation Libraries that can be loaded at different times. This configuration facilitates the creation of new components and allows the default functionality of each component to be easily changed. In order for each component to perform its function, however, each component may require specialized information to carry out its task. The present invention uses a Context structure to permit the run-time transfer of predefined information ("context") between components.

Figure 4:
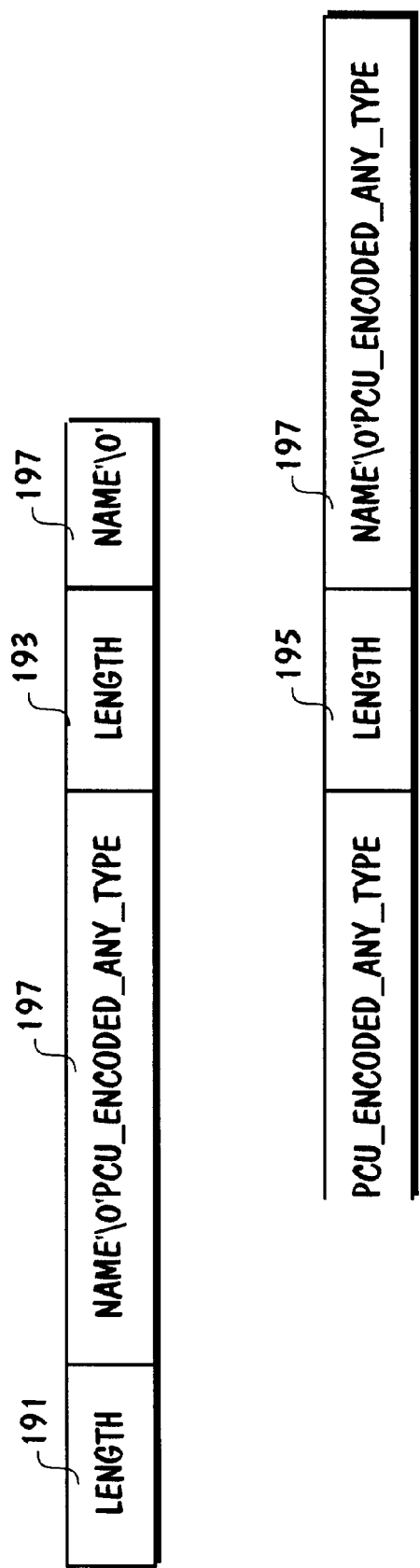
FIG. 4 is a representation of a context data structure used in the method of the present invention.

In a preferred embodiment, context is passed from component to component using the context structure shown in FIG. 4. The structure is an octet string consisting of name/value pairs, where the name is an alphanumeric string and the value 197 is an any type defined in IDL. In addition, the string contains the length 191 of the context element, the length 193 of the entire string, and the length 195 of the name. The value 197 is an "any" type as defined in IDL and encoded using the Presentation Conversion Utilities ("PCU"). A PCU encoding is a presentation-independent encoding of an IDL-defined data structure. The Presentation Conversion Utilities are disclosed in U.S. Pat. No. 5,860,072.

Context is implemented in the present invention as an abstract data type containing a variable amount of data. A component creates context and places information placed in the context structure, such as particular information about the component. The information is provided as part of the factory. The factory is then completed with context and shipped to the navigator. The navigator's decision is based solely on the context information. The information provider may or may not use the information provided in the context. If trading is involved, the trader uses the information.

To manipulate and extend the context, a series of CEE routines are provided. These routines allow the structure of context to change without affecting the applications that utilize the context. Many of these routines take a pointer to a context buffer. The Put functions take a name and a descriptor of a data structure as written in compact IDL notation ("CIN"). CIN is described fully in U.S. application Ser. No. 08/680,270.

A context structure is initialized by a component using the function IM_Context_Initialize, whose prototype is as follows:

```
IM_Context_Initialize (
    in    char    *context,
    in    long    size);
```

The context parameter is an allocated context structure as described above. The size parameter is the buffer space available in the context structure. This function initializes the context structure, preparing it for use by other functions.

To store an element into a context structure, the component can call the function IM_Context_ElementPut, which returns a value IM_Context_RSXXX:

```
IM_Context_RSXXX
IM_Context_ElementPut (
    in    char         *context,
    in    long         contextSize,
    in    const char   *name,
    in    const char   *cin,
    in    void         *buffer);
```

The context parameter contains an initialized context structure. The size of the context structure is specified in contextSize. The name of the element to be stored is specified by the name parameter. The cin parameter is a string describing the data type of the value of the element. The buffer contains the element's value that will be stored upon a successful return from the function. This buffer has the structure of an IDL "any" type.

The function also returns information regarding the success or failure of the operation. The IM_Context_RSXXX value indicates whether or not the operation succeeded. If the operation did not succeed, the return value indicates that (1) an element with the name supplied was not found in the context; (2) the context supplied did not contain a valid context structure; or (3) the context supplied did not have room to store the element.

Three functions, IM_Context_StringPut and IM_Context_LongPut are used to store a string or a long, respectively, into a context structure. These functions are defined as follows:

```
IM_Context_RSXXX
IM_Context_StringPut (
    in    char         *context,
    in    long         contextSize,
    in    const char   *name,
    in    char         stringValue);
IM_Context_RSXXX
IM_Context_StringPut (
    in    char         *context,
    in    long         contextSize,
    in    const char   *name,
    in    char         longValue);
```

In these functions, the context parameter is an initialized context structure. The size of the structure is specified by the contextSize parameter. The name of the string or long to be stored is specified by the name parameter and the value of the string or long to be stored upon a successful return from the function is specified by stringValue or longValue. The function returns IM_ContextXXX to indicate the success or failure of the operation. The return value, IM_Context_RSXXX, is identical to the return values for IM_Context_ElementPut.

To retrieve elements from the context structure, the application or component can call IM_Context_ElementGet, IM_Context_StringGet, or IM_ContextLongGet, which are defined as follows:

```
IM_Context_RSXXX
IM_Context_ElementGet (
    in    const char   *context,
    in    const char   *name,
    out   any          *buffer,
    in    long         bufferSize,
    out   long         *bufferUsed);
IM_Context_RSXXX
IM_Context_StringGet (
    in    const char   *context,
    in    const char   *name,
    out   char         stringValue,
    in    long         stringSize);
IM_Context_RSXXX
IM_Context_LonggGet (
    in    const char   *context,
    in    const char   *name,
    out   long         *longValue);
```

The parameters are similar to their Get counterparts. The name parameter is the name of the string or long or element to be retrieved from the context structure.

Elements can also be deleted from the context structure through IM_Context_ElementDelete, which is defined as follows:

```
IM_Context_RSXXX
IM_Context_ElementDelete (
    in    char         *context,
    in    const char   *name);
```

In this function, context is an initialized context structure and name is the name of the element to be deleted. The return value for each of these operations, IM_Context_RSXXX, is identical to the previous context functions.

VI. Abstractions

A. Adapter

Figure 6:
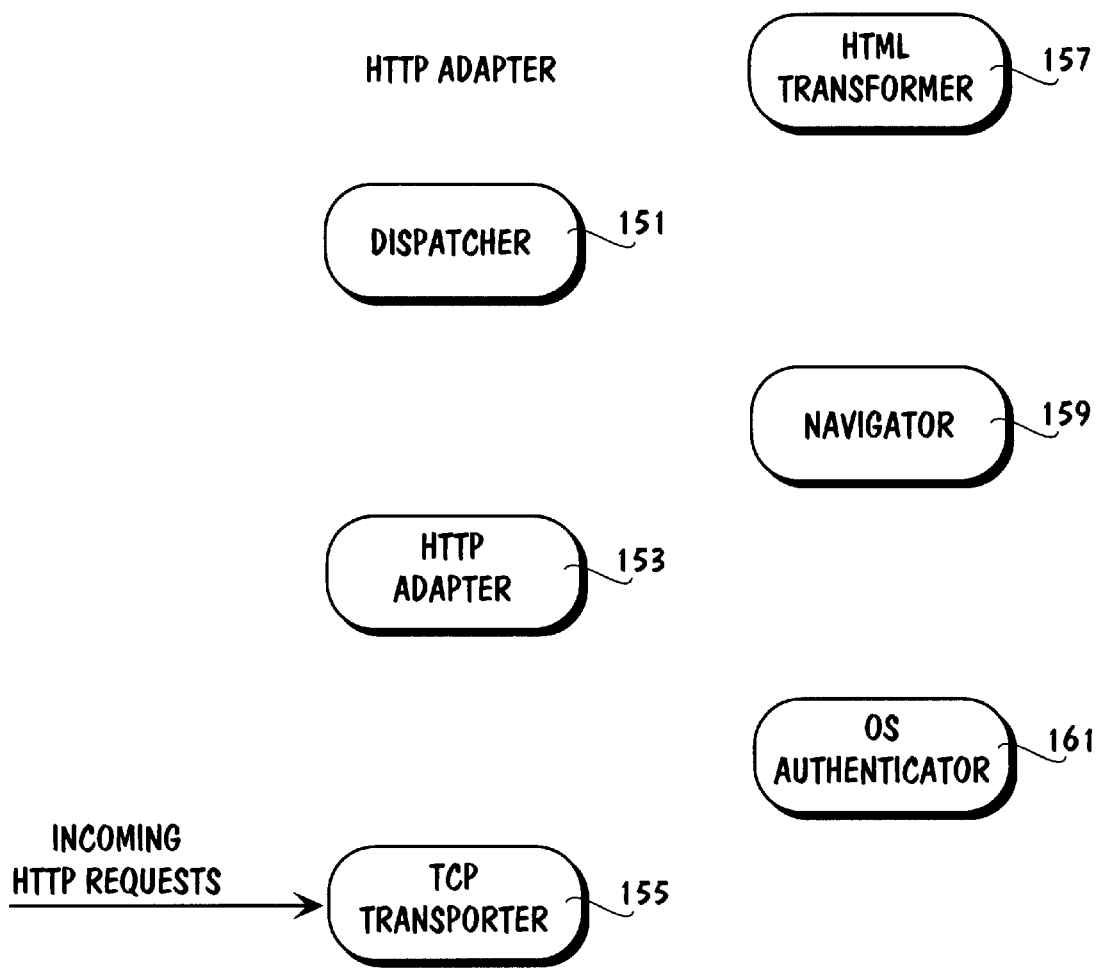
FIG. 6 is a sample HTTP adapter.

Each abstraction—Adapter, Gateway, Server, or Trader—is composed of one or more actual components. The Adapter abstraction waits for incoming requests from a requestor (such as a request from the Web Browser 49 on the client computer). The Adapter components connect information in the information delivery system to the requestor. As shown in the example of FIG. 6, an Adapter may include up to six components: (1) A transporter component; (2) an authenticator component; (3) a dispatcher component; (4) an adapter component (not to be confused with the Adapter abstraction); (5) a navigator component; and (6) a transformer component.

The transporter component provides a requestor with an interface to various transport protocols on different platforms. The transporter component implements TransportFactory and TransportStream interfaces that inherit from the Factory and Stream interfaces, respectively. The TransportFactory creates a TransportStream object. The TransportStream object represents the resources necessary to establish a connection for a request arriving at the transporter component. The TransportStream interface supports the Get and Put operations. The Get and Put operations may correspond to reading and writing data or sending and receiving data. The TransportStream interface adds three additional operations: (1) Connect; (2) Accept; and (3) Disconnect.

The Connect operation is called by a component to connect a TransportStream object to a remote host and is defined as follows:

```
void Connect    (inout unsigned long   opID,
                 in unsigned long      handle,
                 in String             path
                )
raises (Exception);
```

The handle is the handle to the TransportStream object. The path parameter is a string that describes the connection to be made ("remote.host.com:80" for a TCP transporter or "//remote_host/pipe/named_pipe" for a Lan manager, e.g.).

The Accept operation causes the stream to wait for new connections. When a connection is established, the call completes. The Accept operation is defined as follows:

```
void Accept(   inout unsigned long   opID,
               in unsigned long      handle,
               out String            path)
           )
raises (Exception);
```

The handle parameter is the handle for a particular TransportStream object, as returned by the TransportFactory Create call. The path parameter is a string that describes the connection established.

The Disconnect method causes the TransportStream object to disconnect from any remote host to which it is connected. The Disconnect method is defined as follows:

```
void Disconnect (   inout unsigned long   opID,
                    in unsigned long      handle
                )
raises (Exception);
```

The authenticator component authenticates an information request that arrives at an Adapter abstraction. If the request contains user and password information, the authenticator can check the provided information against the operating system to ensure that the combination is valid.

The dispatcher component of the Adapter abstraction is an Implementation Library that directs the processing of a request by dispatching the request to the proper Adapter components in the proper order. In a preferred embodiment, the dispatcher is code that runs a multithreaded statemachine. The dispatcher calls several Create operations for the Factory interfaces of various Adapter components. The dispatcher calls the navigator component to determine which information provider factory object to use for a request. The dispatcher invokes the information provider factory object. The dispatcher then streams data from the information provider stream into the transporter stream until the information provider stream indicates that no more data is available.

The Adapter abstraction includes an adapter component that provides the logic for accepting a request and translating the request into a canonical form for use by other components. This component also provides the logic for returning a reply to the requestor. The adapter component uses a Translator library to convert requests and replies between a particular protocol and context. The Translator library contains functions to parse and generate requests and replies. The adapter component makes a parse request to the Translator library. The parse request takes the request as it arrived, parses it and stores relevant values in the context (as discussed above). Similarly, a reply can be created by taking the context and producing a protocol-specific reply.

The navigator component takes a canonical request (as provided by the adapter component) and decides what information provider and trader to use to fulfill the request. The navigator component implements a Navigator interface having a single Navigate operation, defined as follows:

```
void Navigate (    inout unsigned long   contextbuffer,
                   out unsigned long     factory reference,
                   out String            factoryPath
               )
raises (Exception);
```

The navigator provides navigation through an interface that takes a subject and a context as parameters. The navigator then modifies the context based upon navigation rules that are configured into the component. The rules used by the navigator are subdivided into subjects. A subject is used as a rule in a rule tree. The navigator's configuration can contain many subjects. Navigation based upon a single subject will add additional values to the context related to that particular subject.

Navigation is based upon rules. A rule must contain a condition and can optionally contain an assignment and other rules. A condition consists of atomic conditions. Atomic conditions take one of the following forms:

contextelementname—'regular expression': This atomic condition yields true when the value of the context element indicated by contextelementname is of type string and matches the regular expression given by 'regular expression'.

contextelementname operator "string constant": This atomic condition yields true when the value of the context element indicated by contextelementname is of type string and compares to the string given by "string constant". Operator is one of "=", ">", "<", ">=", or "<=".

contextelementname operator numeric constant: This condition yields true when the value of the context element indicated by contextelementname is of a numeric type and compares to the value given by numeric constant. Operator is one of "=", ">", "<", ">=", or "<=".

In addition, atomic conditions may be combined to yield more complex conditions through the operators "not", "and," and "or".

The transformer component transforms data from one format to another. The transformer can be positioned between a dispatcher component and an information provider. The transformer will appear to be an information provider to the dispatcher component and will appear to be a dispatcher component to the information provider. Thus, transformation is performed transparently to the various components.

A transformer utilizes the Stream and Factory interfaces. The transformer Factory object calls an information provider Factory object to manufacture an information stream. The transformer Factory then manufactures a transformer Stream object and attaches the information stream and a transformation function. The factory returns the transformer Stream object's reference and handle. Exceptions can be returned indicating the success or failure of the operation.

FIG. 6 shows the components of a sample HTTP Adapter. The HTTP adapter includes a TCP transporter component 155 that provides common interfaces to TCP across all platforms. The TCP Transporter factory creates a socket and optionally binds the socket to a port. The TCP Transporter Stream uses the Accept operation to listen and accept socket calls on the port. When a request arrives, the Accept call completes. The Connect operation is used to perform a connect socket call. The TCP Transporter stream can then use the Get operation to perform a receive on the socket. The Put operation is used to perform a send on the socket.

An authenticator component 161 authenticates a request for information that arrives at the adapter from an application. The authenticator component can be utilized to check for password and other user-specific information. This information is checked against the operating system. The dispatcher dispatches the request to the remaining components in the Adapter. A transformer component 157 produces Hypertext Markup Language ("HTML") from different types of textual information.

The adapter component 153 uses the TCP transport to accept HTTP requests and write their replies back over the network. The adapter uses a Translator library containing functions to parse and generate HTTP requests and replies. The adapter makes a parse request that takes the HTTP request header and stores it into context elements.

A navigator component 159 decides, based upon certain configuration information, what information provider or trader should be used to fulfill the request. The functioning of each of these components will be described in detail below following the description of the interfaces implemented by each component.

B. Trader

The trader 150 includes only one component, termed the trader component which implements Trader Factory and Trader Registration interfaces. The dispatcher component of the Adapter calls the trader's Factory object. The trader component uses a load-balancing algorithm to select one information provider out of the many running instances of information providers. The trader returns a valid stream object reference and handle for an Information Provider. At start-up, information providers register with the trader and inform the trader of their capabilities for delivering information.

When the Create operation is called on a trader Factory object by the dispatcher, the trader selects an Information Provider Factory object. The trader calls the factory object for the Information Provider and returns the stream object reference and stream handle to the dispatcher. The trader can return an exception if no information provider factory object of the requested type has registered with the trader or if all available information provider factory objects are busy.

The Trader Registration interface allows information providers to register with the trader. The trader can then select an information provider based upon the information provided to the trader by the dispatcher component of the Adapter. The Trader Registration interface includes a Register New Information Provider operation, an Un-register Information Provider operation, and a Change Registration Information operation. The Register New Information Provider call is used by information providers to register themselves for trading. Each information provider supplies its name (e.g., "File Server, "Gopher Gateway", etc . . . ), its object reference, the maximum number of streams that its factory is configured to create, and any other information that can assist the trader in performing a load-balancing algorithm. The information provider calls the Un-register Information Provider to indicate that the information provider will shutdown or otherwise become unavailable for trading. The Change Registration Information Provider call is used to change the number of streams that a registered information provider can create or another property that affects trading.

If the trader component receives an exception upon calling an information provider factory object, the trader has the possibility to recover from the failing factory. When more than one information provider factory object is available and an exception is returned for one of the factory objects, another factory object may be used. When only one information provider factory object is available and an exception indicates that the factory is temporary, the trader can be configured to wait a predetermined amount of time and retry invoking the factory object.

C. Information Provider

1. Gateways

A Gateway Abstraction is used to connect external information to the Information Matrix. The Gateway includes a transporter component and a gateway component. The transporter component performs the same function as the transporter component used in the Adapter abstraction. Thus, the transporter component provides an abstraction for the various possible transport protocols and the different interfaces to the protocols on different platforms. The gateway component registers itself with the trader at start-up. The gateway component then provides the logic for taking a request in the canonical form (as created by the adapter component) and translating the request into an external request that can be sent out over a network using the transporter component. The gateway component also provides the logic for accepting a reply from a remote host.

The gateway component implements Factory and Stream interfaces. The Factory interface contains only a Create operation. When called, a gateway Factory object creates a Stream object and stream context. The stream context can contain, depending upon its implementation, file handles, SQL cursors, additional object references, etc . . .

The Stream interface uses the Get, Put, and Destroy operations. The Get operation is used to request a certain range of bytes from a stream. The Put operation stores a certain range of bytes in a stream. The Destroy operation tells a Stream object that the object will no longer be used. The Stream object frees its resources and the object may be deleted. In a preferred embodiment, a stream is identified by a Stream object reference and a stream identifier. The stream identifiers are assigned by the gateway stream Factory when a call is made to the Factory. A stream identifier is a handle to an entry in a stream table. The stream table is used as a lookup table to determine the data that must be provided. The stream table contains a streams context that can be different for each implementation of a gateway. Thus, the stream context can contain file handles, socket numbers, object references, SQL cursors, or any other context that must be maintained between different calls to a Stream object.

Figure 7:
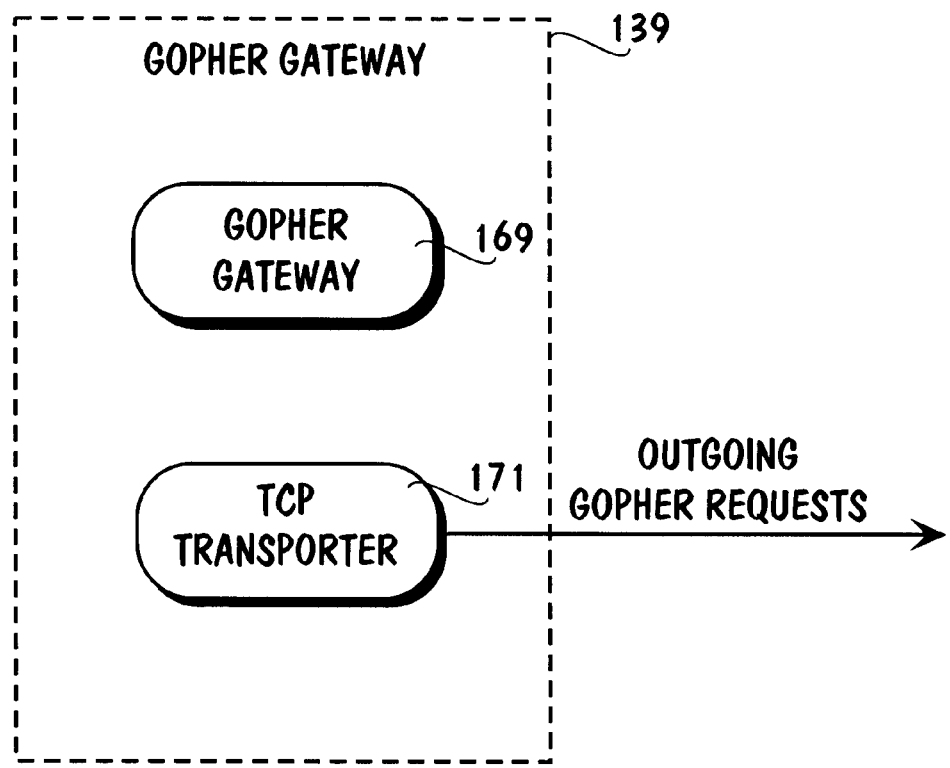
FIG. 7 is a sample Gopher gateway.

FIG. 7 shows a sample gopher gateway 139. The gateway 139 includes a gateway component 169 and a TCP transporter component 171. The gopher gateway 139 uses the same TCP transporter 171 as used in the HTTP adapter. The gopher gateway component 169 uses the TCP transporter component 171 to send gopher requests and receive replies back over the network.

2. Servers

A Server abstraction contains only a server component. The server component accepts a canonical request (as created by the adapter component) and resolves the request by accessing local information. The server implements a Factory and a Stream interface. The Create operation on a server Factory object attempts to open the requested file. If the file is successfully opened, the Factory creates a Stream object is created and initializes an entry in the stream table. The stream table contains the file name, file handle, file size, and number of bytes written and read after each operation.

The Get operation on a Stream object performs a read on the opened file. The Put operation writes to the opened file. The Destroy operation closes the file and deletes the entry in the stream table.

VII. System-Level Interactions Between Components

A. Non-trading Interactions

Figure 8:
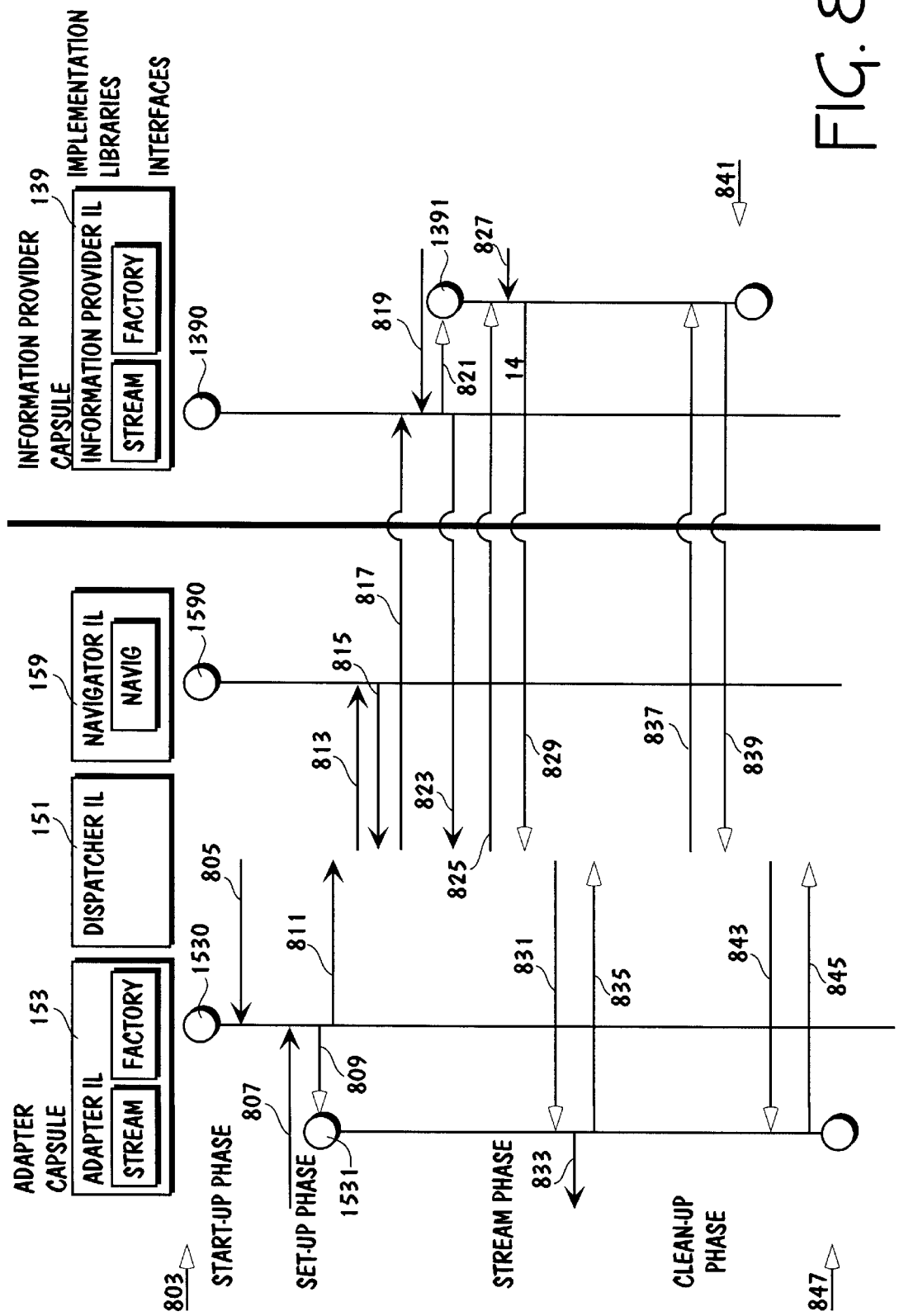
FIG. 8 is a chart depicting component interaction without trading.

Referring now to FIG. 8, a macroscopic view of the interaction between the various components using the above-described interfaces will be described. A more detailed description of each component's implementations is described later. All interactions between the components are based on object calls. The object calls function transparently between objects in the same capsule, between objects in different capsules and between objects on different machines.

Each of the FIGS. 8–13 shows object creation and interaction over a period of time (progressing from top to bottom). In particular, a start-up phase, set-up phase, stream phase, and clean-up phase are shown. Each component (or "Implementation Library" or "IL") is depicted as a box containing one or more additional boxes that represent interfaces. Object creation and destruction is denoted by a hollow circle. The life of the object is denoted by a vertical line extending from the object. An arrow with a hollow point represents object interaction. An arrow with a filled point represents object interaction that includes the passing of a context structure.

Adapters 131, 133, 135 and Information Providers 137, 139, 141, 143 may interact with or without the Trader 150. In most circumstances, a trader 150 is involved. If, however, the information delivery system includes only a single server providing a single purpose, the trader is not necessary. First, with reference to FIGS. 8, 9, and 10, interaction without the trader 150 will be described. This discussion assumes that a request from the WWW browser 49 arrives at the HTTP adapter 131 as shown in FIG. 6 and that the gopher gateway 139, as shown in FIG. 7, will be used as an information provider. It should be apparent, however, that a request may arrive at other adapters, such as a gopher adapter or NNTP adapter, for example. Further, a gopher gateway or FTP gateway or local file server may be used as an information provider.

FIG. 8 shows the streaming of data between components during start-up, set-up, stream, and clean-up phases. As stated above, the components of each abstraction, preferably, are loaded in a separate capsule. In this FIG. 8, Adapter components, including an adapter component 153, a dispatcher component, and a navigator component 159 is loaded in an Adapter capsule. An information provider component 139 is loaded in an Information Provider capsule.

During the start-up phase, the various components are initialized and loaded. In step 803, the implementation libraries are loaded and their initialization routines are called. The initialization routines for an adapter component and information provider component cause a Factory object 1530, 1390 to be created. The navigator component 159 causes a Navigation object 1590 to be created. In step 805, the dispatcher component 151 creates a context structure and calls the Create operation on the adapter 153 Factory object with the context structure as a parameter. When an external request arrives at the adapter 131, from the WWW browser 49 on the client computer 40 or elsewhere, the Create operation will be completed, resulting in an adapter Stream object.

Following this initial start-up phase, the set-up phase begins. The IM computer 60 processes requests that arrive at the adapter 131. In step 807, a request from the WWW browser 49 loaded in the client computer 40 arrives at the adapter 131. The adapter 153 factory, in step 809, creates an adapter Stream object 1531 for the request. The Stream object 1531 is an interface to the web browser 49. Next, in step 811, the adapter 153 replies to the Create call from step 805. The reply to the Create call contains a reference to the newly created Stream object 1531 as well as a stream handle and all details of the request are contained in the context buffer. In step 813, the dispatcher component 151 calls the navigator component 159 with the request context created by the Create call from step 805. The navigator 159 uses the request context to select an information provider Factory object that can create a Stream object to satisfy the external request. In step 815, the navigator 159 replies to the dispatcher 151 with a reference to the selected information provider Factory object 1390. The dispatcher 151 then calls the information provider Factory object 1390 to obtain a Stream object for the requested information. In step 819, the information provider Factory object 1390 accesses the requested information. Next, in step 821, the information provider Factory manufactures a Stream object 1391 for the information. Finally, in step 823, the information provider Factory object 1390 returns a reference to the created information provider Stream object 1391 to the dispatcher 151.

During the stream phase, objects and components stream data to each other. Streaming can occur in both directions between information provider and requester. The stream phase shown in FIG. 8 describes the retrieval of information from an information provider to a requester. The storage of data in an information provider is similar to the case of retrieval except the data flows in the opposite direction. In step 825, the dispatcher 151 calls the information provider Stream object 1391 using the Get operation to obtain a block of data from the stream. The information provider 139, in step 827, accesses the external information source (or local information source, in the case of a server) to obtain a piece of data of the size requested. Next, in step 829, the information provider stream object 1391 returns the piece of data and a value (usually a boolean) that indicates whether there is more data available from the stream. The dispatcher 151 calls the adapter Stream object 1531 using the Put operation supplying the data returned by the information provider stream. In step 833, the Adapter returns the requested information to the external requestor (the WWW browser 49). In step 835, the adapter returns the Put call made in step 831.

When streaming is completed, as indicated by the information provider stream returning from a completed Get operation, the streams are destroyed. In step 837, the dispatcher 151 calls the Destroy operation of the information provider Stream object 1391. In step 839, the information provider returns the call. Next, in step 841, the information provider Stream object 1391 destroys itself after closing and freeing all resources acquired for the stream. The dispatcher 151, in step 843, calls the Destroy operation of the adapter Stream object 1531. In step 845, the adapter Stream object 1531 returns the call. Finally, in step 847, the adapter stream object 1531 destroys itself after closing and freeing all resources acquired for the stream object.

B. Interaction with Trader

Figure 9:
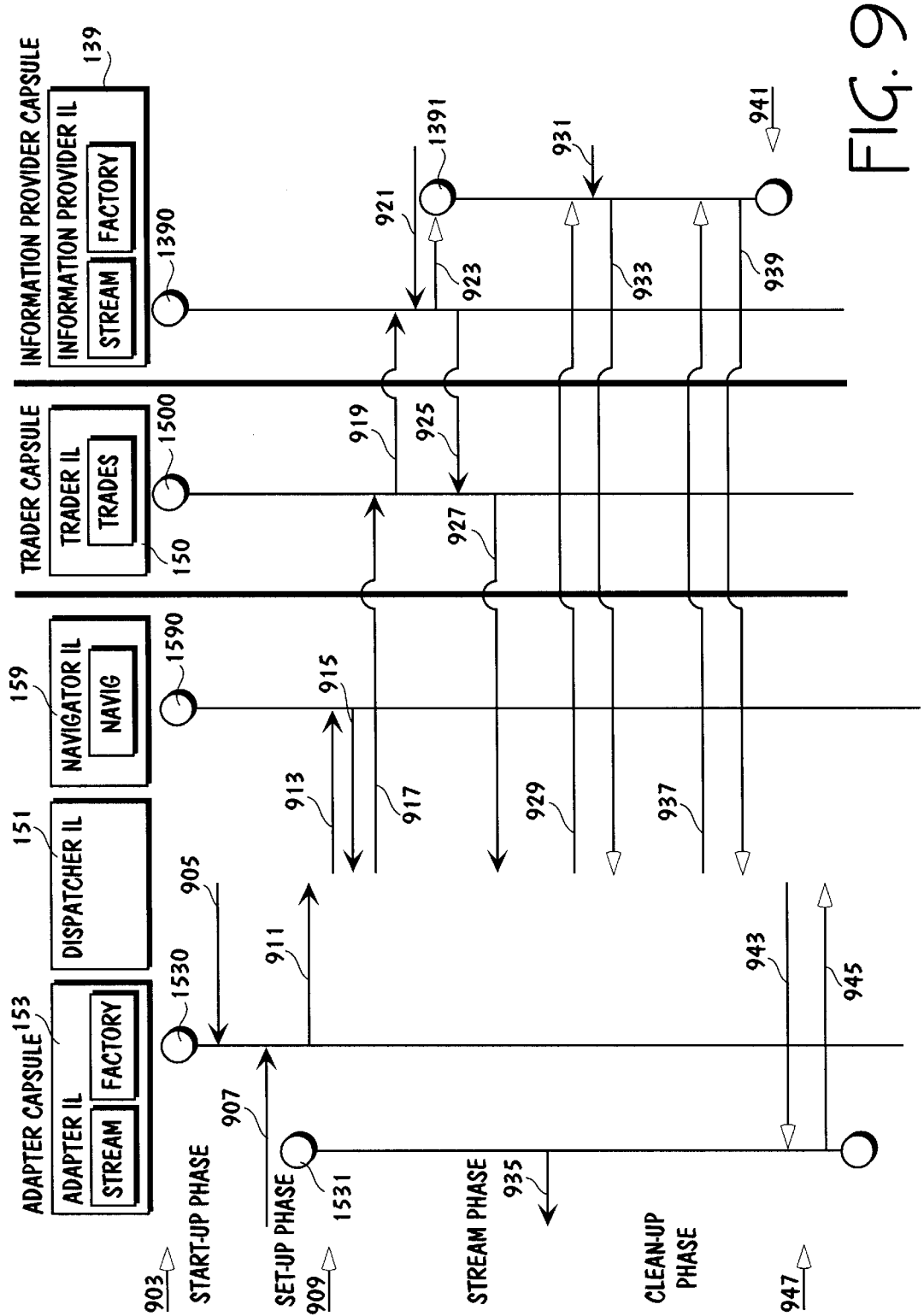
FIG. 9 is a chart depicting component interaction with trading.

Now, with reference to FIG. 9, component interaction with the trader component 150 will be described. The start-up phase is similar to the start-up phase in the non-trader context, except that the information provider factory object 1390 registers itself with the trader object 1500 at start-up. In step 907, a request from the WWW browser 49 arrives at the HTTP adapter 131. In step 909, the adapter 153 creates a Stream object 1531 for the request that acts as an interface to the web browser 49. The adapter 153, in step 911, completes the factory operation by replying to the factory call from the start-up phase. The reply contains a reference to the created Stream object 1531 and also contains details about the request in a request context. The dispatcher 151, in step 913, calls the navigator 159 with the request context created in the start-up phase. The navigator 159, based upon the rules discussed above, uses the context to select a trader object 1500 capable of creating a stream to satisfy the external request. (If a single trader 150 is used, the navigator 159 selects the single trader.) In step 915, the navigator 159 replies with an object reference to the selected trader object 150. The dispatcher 151 then calls the trader object 1500 to obtain an information provider Stream object for the requested information The trader object 1500, in step 919, selects an information provider Factory object 1390 and calls the object. The Factory object 1390 is selected based upon a load-balancing algorithm. The information provider Factory object 1390 accesses the requested information in step 921 and manufactures a Stream object 1391 for the requested information in step 923. Next, the information provider Factory object 1390 returns the call with a reference to the created Stream object 1391. The trader object 1500, in step 927, returns the reference for the information provider stream object 1391 to the dispatcher. Streaming of data and clean-up is similar to the non-trading scenario. The trader 150 is transparent to the non-navigator components.

VIII. Abstraction-level Interaction Between Components

As stated above, each abstraction may carry out the above operations as required for a particular developer's needs. An Adapter abstraction, for example, may or may not include an authenticator. Accordingly, each abstraction may have a different internal structure. Now, with reference to FIGS. 10–13, preferred interaction between components within an abstraction will be discussed.

A. Adapters

Figure 10A:
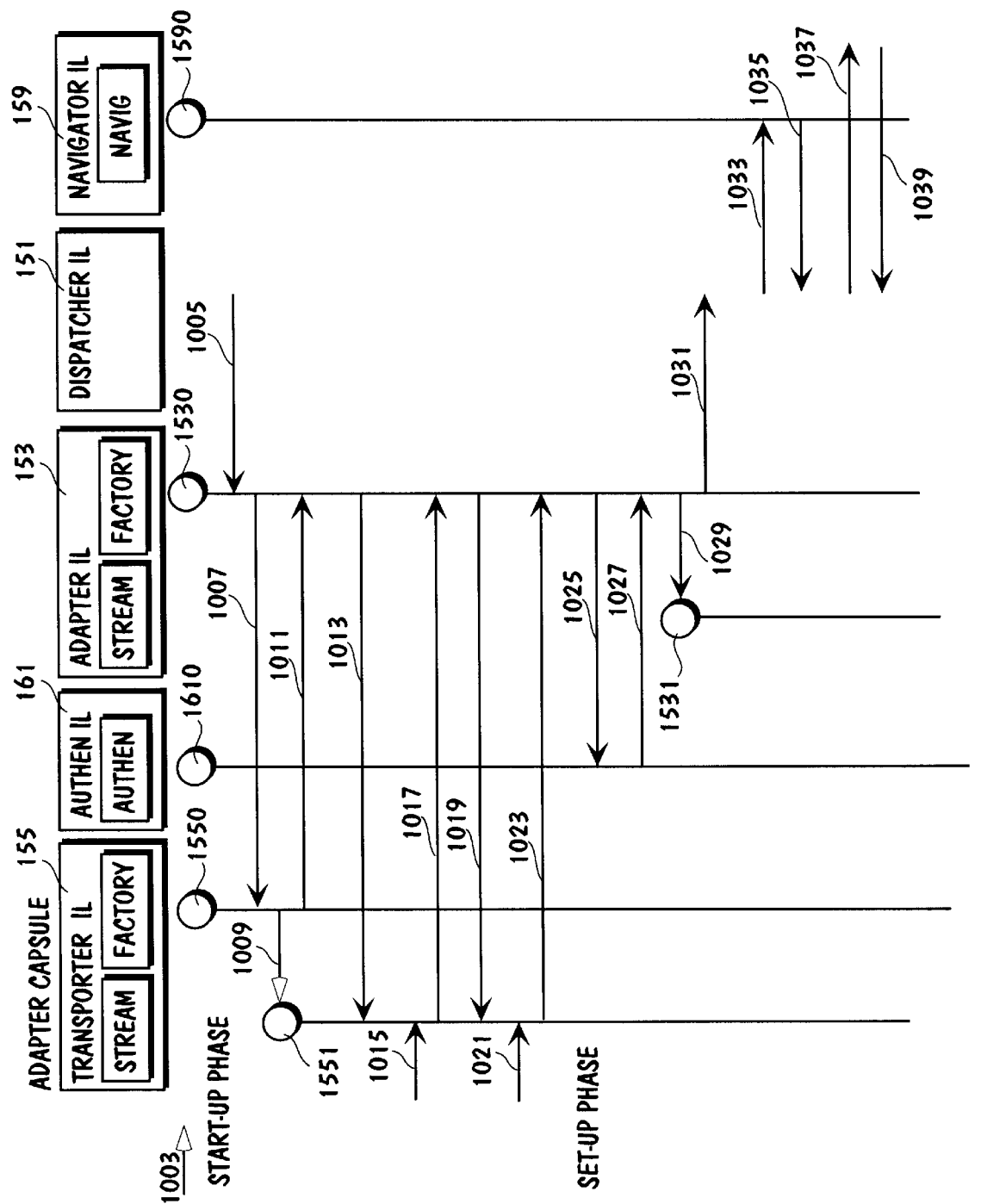
FIG. 10a is a chart depicting the start-up and set-up phases for Adapter component interaction.
Figure 10B:
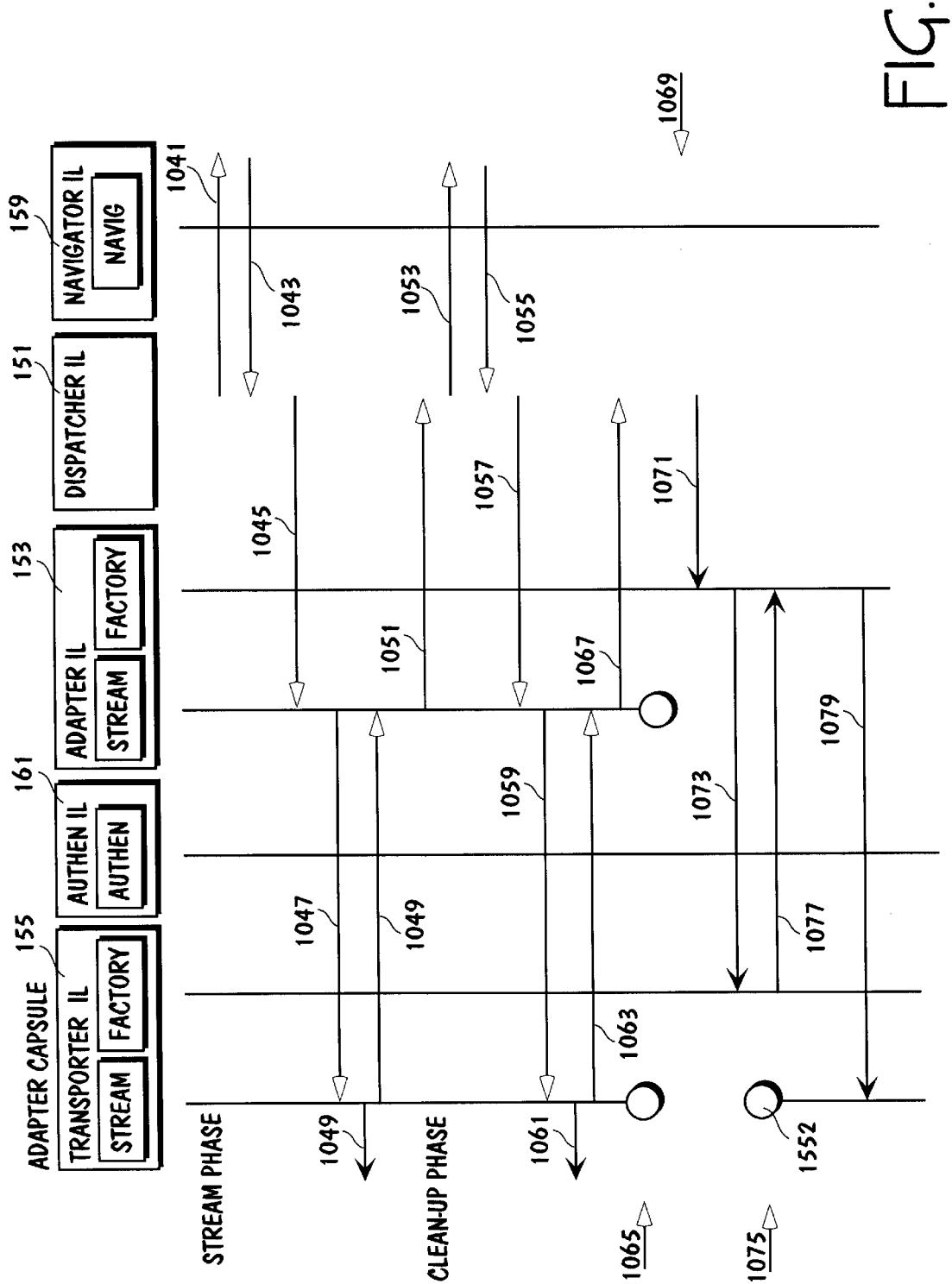
FIG. 10b is a chart depicting the stream and clean-up phases for Adapter component interaction.

FIGS. 10a–10b shows the interaction between Adapter components. In step 1003, the initialization routines of the authenticator 161 and navigator 159 create objects 1610, 1590 to satisfy requests. The transporter 155 and the adapter 53 create Factory objects 1550, 1530. In step 1005, the dispatcher 151 calls the Factory object 1530 created by the adapter 153. (The dispatcher may call the Factory object many times depending upon the number of requests that the dispatcher is willing to serve. For this example, we assume that only one request can be handled.) In step 1007, the adapter, upon receiving the call to the Factory object, calls the transporter Factory object 1550. The transporter Factory object 1550, in step 1009, creates a transporter Stream object 1551. The transporter Factory object 1551 returns the transporter Stream object reference and handle to the adapter 153 in step 1011. The adapter 151, in step 1013, calls the transporter Stream object's Accept operation. The Accept operation, as discussed above, causes the transporter stream object 1551 to wait for incoming requests.

The set-up phase begins at step 1015. In step 1015, a connect request from the web browser 49 arrives at the Adapter over the network. Specifically, the request arrives at the transporter component 155 causing the transporter stream object 1551, in step 1017, to return the outstanding Accept call. The adapter Factory object 1530, in step 1019, calls the transporter Stream object 1551 to read the incoming request in step 1021. In step 1023, the transporter Stream object 1551 returns the data to the adapter Factory object 1530. The adapter Factory object 1530, in step 1025, parses the request. If the request contains user information, this user information is validated by the authenticator in step 1027. In step 1029, the adapter Factory object 1530 creates an adapter Stream object 1531. The adapter Stream object 1531 has a context component that includes the transporter Stream object reference and handle. In step 1031, the adapter Factory object 1530 returns the Create call from step 1005 by returning the adapter Stream object reference and handle to the dispatcher 151. The dispatcher 151, in step 1033, calls the navigator 159 to find an information provider for the request. The navigator 159, in step 1035, returns a reference to an information provider object if a trader is not used. If a trader is used, the navigator 159 returns a trader object reference. The navigator may also return a transformer object reference. The dispatcher 151, in step 1037, calls the information provider Factory object (not shown) to manufacture a Stream object. The information provider returns a Stream object and handle in step 1039.

FIG. 10b shows the stream phase and clean-up phase for an Adapter abstraction. In step 1041, the dispatcher 151 calls the Get operation on the information provider Stream object to obtain a block of data. The information provider Stream object returns the block of data in step 1043. In step 1045, the dispatcher 151 writes the retrieved data to the adapter stream object 1531 using the Put operation. In step 1047, the adapter Stream object 1531 writes the data to the transporter Stream object 1551 using the Put operation. The transporter Stream object 1551 writes the data over the network to the web browser 49 in step 1049. In steps 1049 and 1051, the transporter Stream object 1551 and adapter Stream object 1531 return their respective Put operations. The process of continuously calling the Get operation on the information provider stream object and the Put operation on the adapter and transporter stream objects continues until the information provider stream object returns an end-of-stream indication to the dispatcher 151.

In step 1053, the dispatcher 151 calls the information provider Stream object using the Destroy operation. The information provider Stream object, in step 1055, returns the call and destroys itself. In step 1057, the dispatcher 51 calls the adapter Stream object using the Destroy operation. The adapter Stream object 1531, in turn, calls the transporter stream object's Destroy method in step 1059. The transporter Stream object 1551, in step 1061, ends the request by closing the network connection. In step 1063, the transporter Stream object 1551 completes the call from step 1059 and destroys itself in step 1065. The adapter Stream object 1531, in step 1067, completes the call from step 1057 and destroys itself in step 1069. The dispatcher recalls the adapter Factory object 1530 in step 1071 to obtain the next incoming request. In step 1073, the adapter 153 calls the transporter Factory object. The transporter Factory object creates a transporter Stream object 1552 in step 1075. In step 1077, the transporter Factory object returns the created Stream object reference and handle to the adapter 53. The adapter 153, in step 1079, calls the transporter Stream object's Accept operation. The transporter 55 is then ready to accept another request. When a new request arrives, the adapter enters the set-up phase once again.

B. Traders

Figure 11:
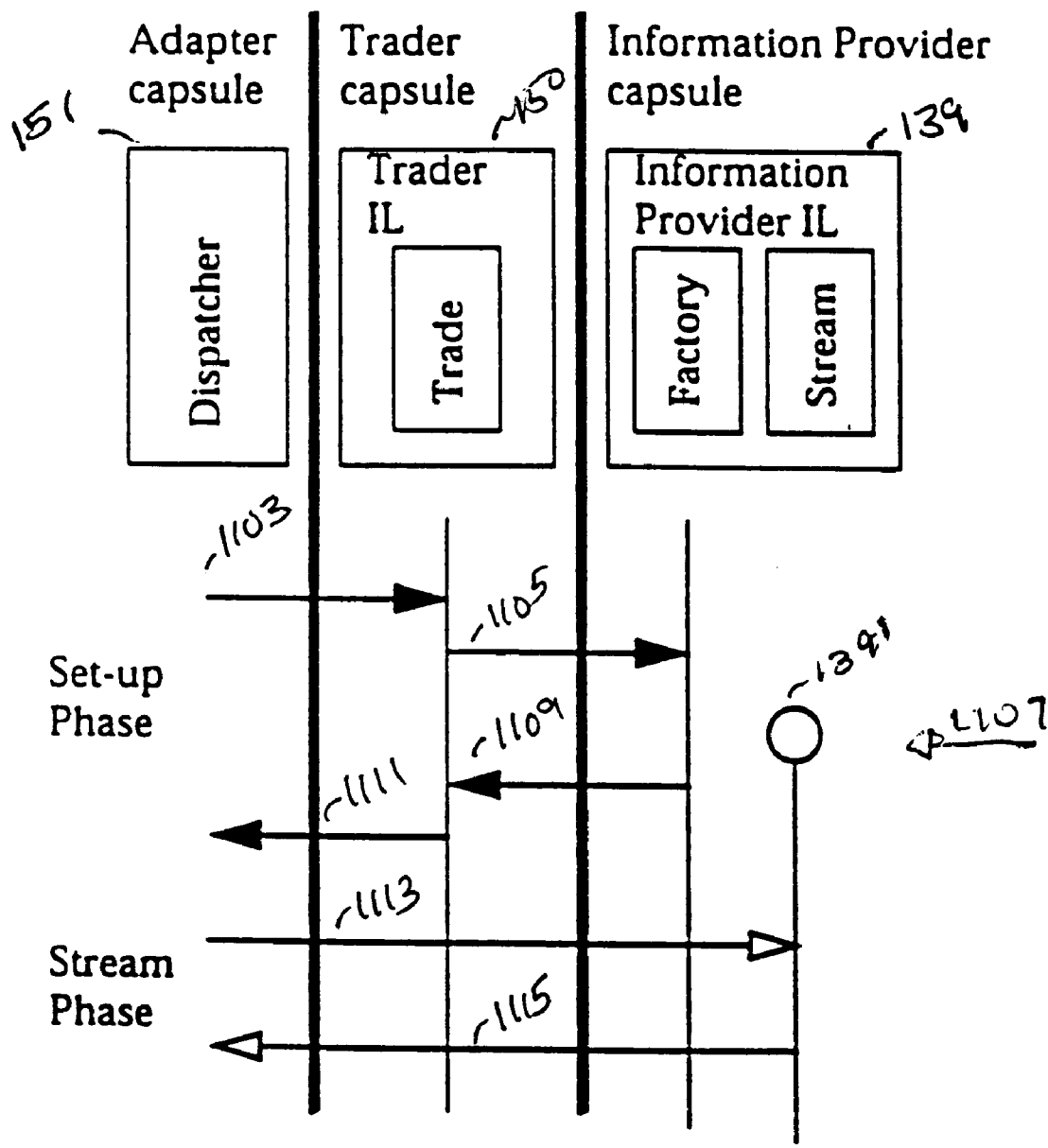
FIG. 11 is a chart depicting trader interaction.

As discussed above, a Trader includes only a trader component implementing a Trader Factory and Trader Registration interface. The trader component implements these interfaces as shown in FIG. 11. During the set-up phase, a factory request arrives at the trader 150, and the trader selects an instance of a particular class of information providers that can fulfill the request. The trader, in step 1105, then calls the information provider Factory to manufacture an information provider Stream object. The information provider creates a Stream object 1391 in step 1107. Next, in step 1109, the information provider returns the information provider Stream object reference and stream identifier to the trader. The trader returns the information provider stream to the caller—the dispatcher—in step 1111. During the stream phase, the dispatcher continues to stream from the information provider stream without being aware of the intermediacy of the trader. When the information provider finishes streaming, in step 1115, it sends an end-of-stream indication. During clean-up, the dispatcher destroys the manufactured stream. Clean-up occurs without the use of the trader 150.

C. Information Providers

Figure 12:
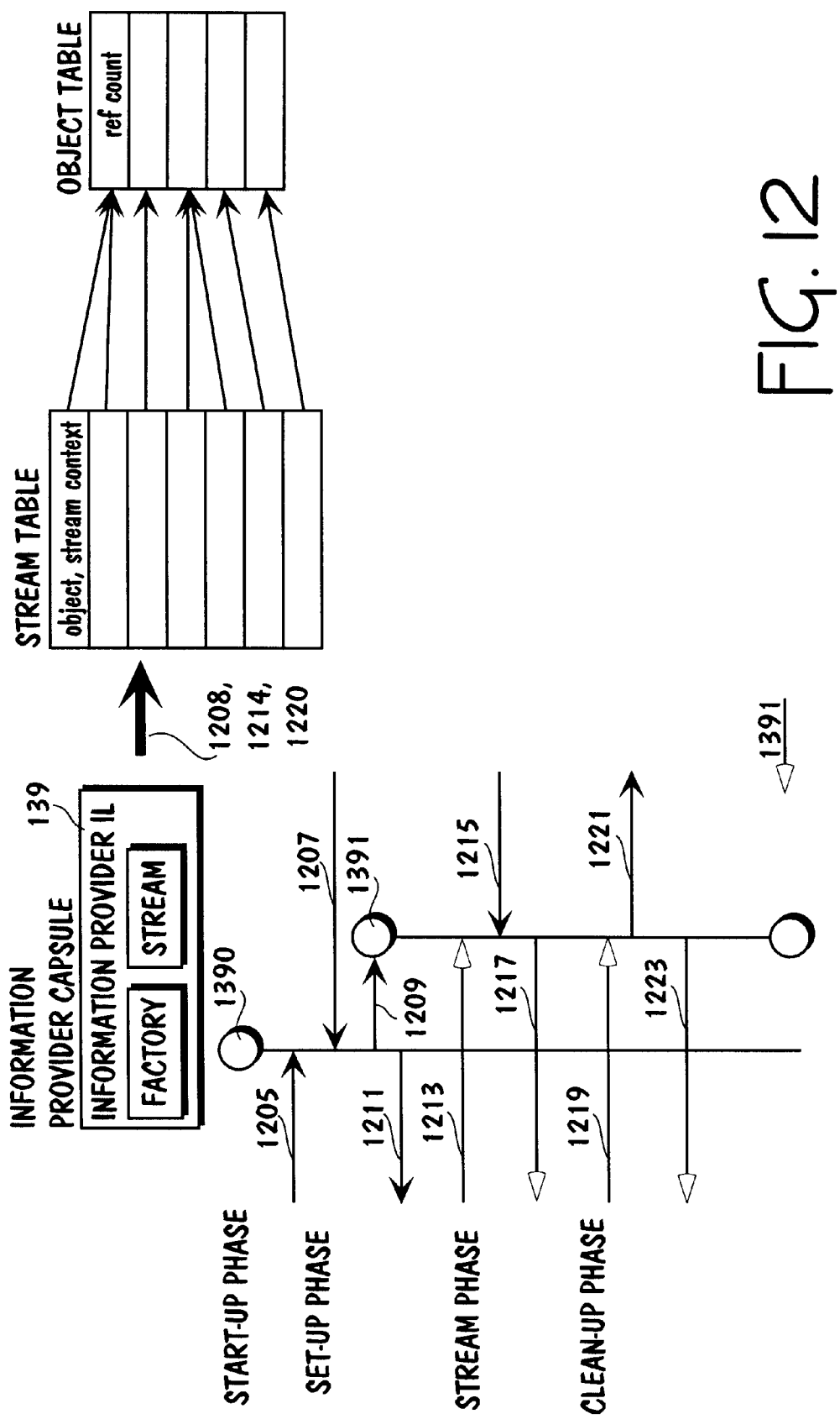
FIG. 12 is a chart depicting Information Provider component interaction.

FIG. 12 describes the information provider implementation of Factory and Stream interfaces using a stream table and an object table stored in memory 40. In the start-up phase, at step 1203, the initialization routines of the implementation libraries are called. This routine creates an information provider Factory object 1390. If the trader is being used, the information provider will register with the trader by calling the trader object using the Register New Information Provider operation. In step 1205, the information provider receives a factory call from the dispatcher or from the trader. In the implementation of the information provider Factory, information in the call is used to select an information source and verify that the source can access the information. In step 1208, the Factory implementation selects a stream table entry for a new stream. The implementation generates a new unique handle for the stream and writes the stream context into the table entry. Next, in step 1209, the Factory implementation creates or selects an addressable Stream object 1391. The Stream object reference and handle are returned to the caller in step 1211.

In the stream phase, streaming can take place in two directions using the Get and Put operations. In step 1213, a stream call arrives at the Stream object via a Get or Put Call. The call contains the stream handle. The stream object 1391 validates the stream handle and uses the handle to access the entry in the stream table in step 1214. The information in the stream table is used, in step 1215, to access the data required to complete the call. In step 1217, the Stream object 1391 returns the call.

In the clean-up phase, a Destroy call containing the stream handle arrives at the stream object 1391. In step 1220, the stream handle is validated and used to find the stream table entry. In step 1221, the information source is closed. In step 1223, the Destroy call completes, thus destroying the Stream object 1391 in step 1225 and freeing the stream table.

D. Transformers

Figure 13:
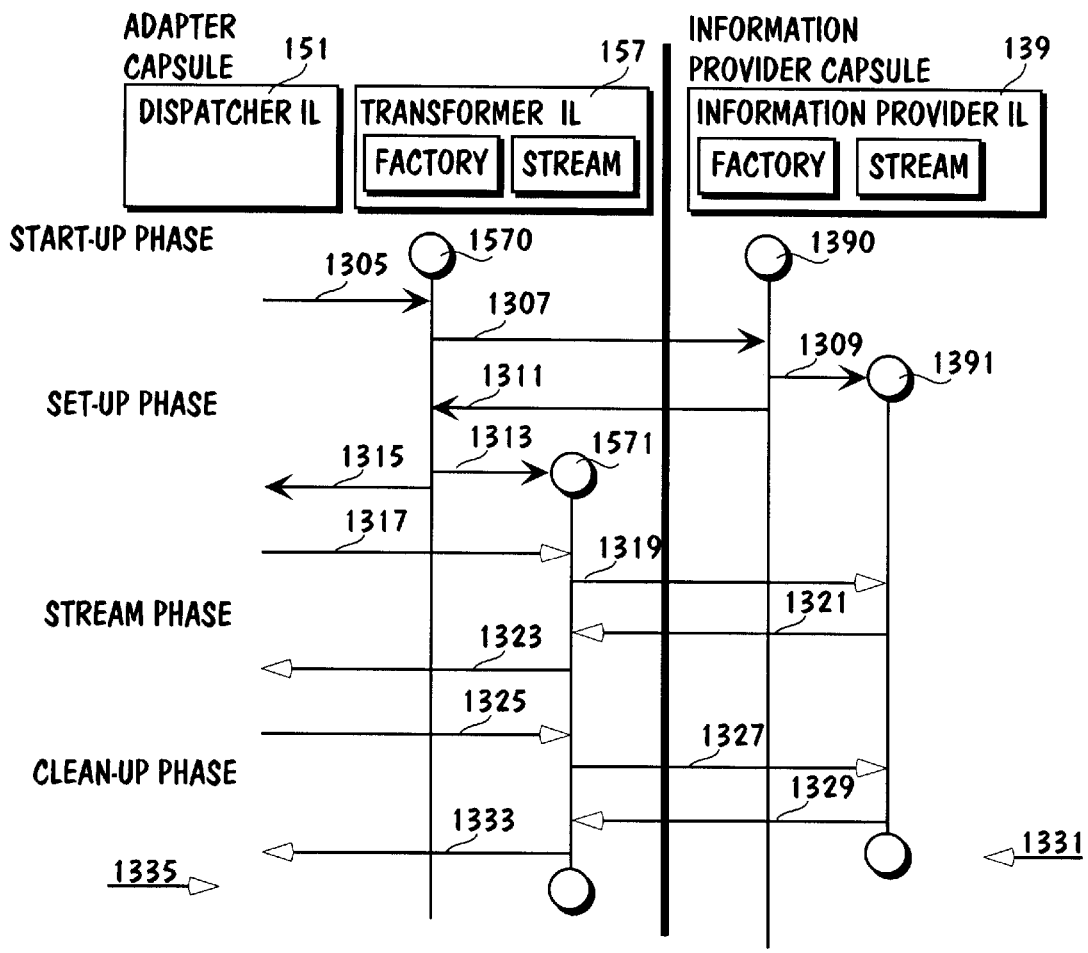
FIG. 13 is a chart depicting transformer component interaction.

Transformers may be used with Adapters and Gateways. Accordingly, streaming of data occurs differently if a transformer component is used. FIG. 13 shows the interactions to and from a transformer component. Initially, in step 1303, a transformer Factory object 1570 and information provider Factory object are created. Next, in step 1305, a factory call arrives at the transformer factory object 1570 from the adapter component 153. The transformer Factory object 1570 calls an information provider Factory object 1390 in step 1307. The information provider Factory object 1390 creates an information provider Stream object 1391 in step 1309. In step 1311, the information provider Factory object 1390 returns the newly created Stream object's reference to the transformer Factory object 1570. The transformer Factory object 1570, in step 1313, creates a transformer Stream object 1571 and keeps the information provider Stream object's reference as part of the transformer Stream object's context. The transformer Factory object 1570 returns the transformer Stream object reference and handle to its caller.

In step 1317, a Get call arrives at the transformer's Stream object 1571. The transformer, in step 1319, calls the information provider stream object 1391 using a Get call to obtain data. The information provider Stream object 1391 returns data in step 1321. The transformer transforms this data using a transformation function. The transformation function examines the retrieve buffer for data to be transformed. If sufficient data to be transformed is contained in the buffer, the data is removed from the retrieve buffer, transformed and stored in the reply buffer. The Get call to the information provider is called again if the reply and retrieve buffer are not full and the information provider's stream object does not indicate "no more data". The transformer stream object's Get method returns the data from the reply buffer. The Stream object 1571 will indicate that "no more data" is available is there is not a "no more data" indication on the information provider's stream object, the retrieve buffer is empty, or the remainder of the reply buffer is returned. In step 1323, the data is returned to the dispatcher. If data were being stored, a Put call would arrive at the transformer in step 1317. The Put operation works similarly to the Get operation except information flows in the opposite direction.

In the clean-up phase, the Destroy method arrives at the transformer Stream object 1571 in step 1325. The transformer 157 performs a Destroy call on the information provider's Stream object 1391 in step 1327. The information provider Stream object, in step 1329, returns the call. The information provider destroys the information provider Stream object 1391 in step 1331. The transformer stream object 1571 returns the call in step 1333. The transformer, in step 1335, destroys the Stream object 1571.

Having thus described a preferred embodiment of an object-oriented method and apparatus for delivering information, it should be apparent to those skilled in the art that certain advantages of the within system have been achieved. It should also be appreciated that various modifications, adaptations, and alternative embodiments thereof may be made within the scope and spirit of the present invention. For example, the use of a single trader has been illustrated, but it should be apparent that the inventive concepts described above would be equally applicable to a multiple-trader scenario. Indeed, each component may be replicated to support numerous protocols and configurations. The invention is further defined by the following claims.

What is claimed is:

1. An object-oriented method for delivering requested information stored in a first computer memory to a requestor stored in a second computer memory, the method comprising the steps of:

loading into the first computer an information provider component for accessing the requested information;

creating an information provider factory object from the information provider component;

loading into the first computer a navigator component for selecting the information provider component;

creating a navigator object from the navigator component;

loading into the second memory an adapter component for accepting a request from the requestor for the requested information from the requester;

creating an adapter factory object from the adapter component for creating an adapter stream object;

creating the adapter stream object for the request from the adapter factory object;

creating a information provider factory object from the information provider component;

selecting the information provider factory object using the navigator object;

accessing the requested information using the information provider factory object;

creating an information provider stream object from the information provider factory object; and delivering the requested information from the information provider component to the adapter component using the adapter stream object and information provider stream object.

2. The method for delivering information, as recited in claim 1, further comprising the steps of:

loading, in the second computer memory, a dispatcher component for dispatching the request to the adapter and information provider components; and calling the navigator object from the dispatcher component with request context containing information regarding the request.

3. The method for delivering information, as recited in claim 2, wherein the navigator object selects the information provider factory object using the request context.

4. The method for delivering information, as recited in claim 3, wherein the request context is an octet structure that includes a context name and a context value.

5. The method for delivering information, as recited in claim 1, wherein the step of streaming information from the information provider component to the adapter component further comprises the steps of:

calling the information provider stream object to obtain a discrete portion of the requested information;

accessing the discrete portion of requested information with the information provider stream object;

returning the discrete portion of requested information;

calling the adapter stream object to write the discrete portion of requested information to the adapter stream object;

returning the discrete portion of requested information to the requester.

6. The method for delivering information, as recited in claim 5, further comprising the step of indicating whether another discrete portion of requested information is available from the information provider stream object.

7. The method for delivering information, as recited in claim 6, further comprising the steps of:

destroying the information provider stream object; and destroying the adapter stream object.

8. The method for delivering information, as recited in claim 5, wherein the step of creating an information provider stream object from the information provider factory object further comprises the steps of:

using information contained in the call to the information provider factory object to select an information source;

selecting an entry from a stream table stored in memory for a new stream;

generating a handle for the stream;

writing stream context information regarding the stream into the stream table entry;

creating the information provider stream object; and returning an information stream object reference and the handle to the caller of the information provider factory object.

9. The method for delivering information, as recited in claim 8, further comprising the steps of:

validating a stream handle included in the call to the information provider stream object;

accessing the stream table based upon the validated stream handle; and wherein the step of accessing the step of accessing the discrete portion of requested information is performed using information in the accessed stream table entry.

10. The method for delivering information, as recited in claim 8, further comprising the steps of:

closing the information source; and destroying the information provider stream object.

11. The method for delivering information, as recited in claim 4, further comprising the steps of:

initializing and loading into memory at least one transporter component for providing an interface to a particular transport protocol, and at least one authenticator component for authenticating the request for information;

creating a transporter factory object;

calling the transporter factory object;

creating a transporter stream object;

calling the transporter stream object in response to the request for information;

reading the request for information; and returning data regarding the request for information to the adapter factory object.

12. The method for delivering information, as recited in claim 10, wherein the step of returning the discrete portion of requested information to the requestor further comprises the steps of:

writing the discrete portion of requested information to the transporter object; and writing the data to the requestor;

destroying the information provider stream object;

destroying the adapter stream object; and destroying the transporter stream object.

13. The method for delivering information, as recited in claim 4, further comprising the steps of:

initializing and loading into memory at least one transformer component for transforming the discrete portion of the requested information into a desired format;

creating a transformer factory object;

calling the transformer factory object;

creating a transformer stream object;

streaming the discrete portion of requested information from the information provider stream object to the transformer stream object; and transforming the discrete portion of the requested information into the desired format.

14. An object-oriented method for delivering information from a component stored in a memory of a computer to another component stored in the same computer or another computer, the method comprising the steps of:

initializing and loading into the memory at least one adapter component for accepting a request for information from a requestor, at least one information provider component for providing the requested information, at least one trader component for selecting one of the at least one information component, and at least one navigator component for selecting one of the at least one trader component;

registering the at least one information provider component with the trader component;

creating a trader object for the at least one trader component;

creating a factory object for the at least one adapter component;

calling the adapter factory object;

creating an adapter stream object for the request from the adapter factory object;

creating a factory object for each of the at least one information provider components;

selecting an information provider factory object using a load-balancing algorithm in the trader object;

calling the selected information provider factory object;

creating an information provider stream object from the selected information provider factory object; and streaming the requested information from the information provider component to the trader component to the adapter component using the adapter stream object and the selected information provider stream object.

15. The method for delivering information, as recited in claim 13, wherein the step of streaming information from the information provider component to the adapter component further comprises the steps of:

calling the information provider stream object to obtain a discrete portion of the requested information;

accessing the discrete portion of requested information with the information provider stream object;

returning the discrete portion of requested information;

calling the adapter stream object to write the discrete portion of requested information to the adapter stream object;

returning the discrete portion of requested information to the requester.

16. The method for delivering information as recited in claim 14, further comprising the step of:

indicating whether another discrete portion of requested information is available from the information provider stream object.

17. The method for delivering information, as recited in claim 15, wherein the step of creating an information provider stream object from the information provider factory object further comprises the steps of:

using information contained in the call to the information provider factory object to select an information source;

selecting an entry from a stream table stored in memory for a new stream;

generating a handle for the stream;

writing context information regarding the stream into the stream table entry;

creating the information provider stream object; and returning an information stream object reference and the handle to the caller of the information provider factory object.

18. The information delivery system as recited in claim 17, further comprising:

at least one navigator component for selecting one of the at least one information provider components based upon configuration information.

19. The information delivery system as recited in claim 17, wherein the object-oriented means further comprises:

a factory interface implemented by the at least one information provider component and the at least one adapter component; and a stream object interface implemented by the at least one information provider component and the at least one adapter component;

wherein a call to a factory object creates a stream object and wherein a call to a stream object sends or retrieves a discrete portion of the requested information.

20. The information delivery system, as recited in claim 17, further comprising:

at least one trader component for selecting one of the at least one information provider components based upon a load-balancing algorithm; and at least one navigator component for selecting at least one of the trader components based upon configuration information.

* * * * *

UNITED STATES PATENT AND TRADEMARK OFFICE
CERTIFICATE OF CORRECTION

PATENT NO. : 6,173,327 B1  Page 1 of 1
DATED : January 9, 2001
INVENTOR(S) : Jeroen De Borst, Peter Bonham, Ansgar Erlenkoetter, Andrew Schofield, Reto Kaeser It is certified that error appears in the above-identified patent and that said Letters Patent is hereby corrected as shown below:

Claim 15,
Line 2, delete "claim 13" and insert in its place -- claim 14 --.

Claim 16,
Line 2, delete "claim 14" and insert in its place -- claim 15 --.

Claim 17,
Line 2, delete "claim 15" and insert in its place -- claim 16 --.

Signed and Sealed this

Twentieth Day of November, 2001

*Attest:*

*Attesting Officer*

NICHOLAS P. GODICI
*Acting Director of the United States Patent and Trademark Office*